(12) United States Patent
Fujii

(10) Patent No.: US 9,616,766 B2
(45) Date of Patent: Apr. 11, 2017

(54) POWER SOURCE DEVICE, VEHICLE PROVIDED WITH POWER SOURCE DEVICE, AND POWER STORAGE DEVICE

(71) Applicant: SANYO Electric Co., Ltd., Osaka (JP)

(72) Inventor: Kazuhiro Fujii, Hyogo (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 156 days.

(21) Appl. No.: 14/408,547

(22) PCT Filed: Aug. 26, 2013

(86) PCT No.: PCT/JP2013/005015
§ 371 (c)(1),
(2) Date: Dec. 16, 2014

(87) PCT Pub. No.: WO2014/034079
PCT Pub. Date: Mar. 6, 2014

(65) Prior Publication Data
US 2015/0144409 A1    May 28, 2015

(30) Foreign Application Priority Data

Aug. 30, 2012  (JP) ................................ 2012-189743

(51) Int. Cl.
*B60L 11/18* (2006.01)
*H01M 2/20* (2006.01)
(Continued)

(52) U.S. Cl.
CPC ......... *B60L 11/1879* (2013.01); *B60L 3/0046* (2013.01); *H01M 2/1077* (2013.01);
(Continued)

(58) Field of Classification Search
CPC ..... B60L 11/1879; B60L 3/0046; H02J 7/007; H02J 7/35; H02J 7/1415; H02J 7/0022;
(Continued)

(56) References Cited

U.S. PATENT DOCUMENTS

| 6,275,004 B1 * | 8/2001 | Tamai ...................... B60K 6/28 320/116 |
| 2010/0073005 A1 * | 3/2010 | Yano .................... H01M 2/1066 324/427 |

(Continued)

FOREIGN PATENT DOCUMENTS

| JP | 2003-100273 | 4/2003 |
| JP | 2011-091035 | 5/2011 |

(Continued)

OTHER PUBLICATIONS

Merriam-Webster (Lattice definition Merriam Webster Lattice Definition {http://www.merriam-webster.com/dictionary/lattice} Wayback posting evidence Apr. 25, 2009).*

(Continued)

*Primary Examiner* — Patrick Ryan
*Assistant Examiner* — Aaron Greso
(74) *Attorney, Agent, or Firm* — Wenderoth, Lind & Ponack, L.L.P.

(57) ABSTRACT

A power supply device comprises plural battery cells having a rectangular box shape and electrode terminals, a binding member binding a battery stacked member stacking the battery cells, bus bars connecting electrode terminals of the battery cells, and an insulating bus bar holder covering the upper surface of the battery stacked member. The binding member binds the battery stacked member at the side surface and upper surface thereof. The binding member comprises a side covering portion covering the side surface of the battery stacked member, and an upper covering portion covering the (Continued)

upper surface of the battery stacked member. The bus bar holder is divided into an intermediate holder located at the intermediate portion, and side surface holders located at the side surfaces of both sides of the intermediate holder. The side surface holder and the intermediate holder are press-fitted by a press-fitting structure.

15 Claims, 26 Drawing Sheets

(51) Int. Cl.
| | | |
|---|---|---|
| *H01M 2/10* | (2006.01) | |
| *H01M 10/04* | (2006.01) | |
| *H02J 7/00* | (2006.01) | |
| *B60L 3/00* | (2006.01) | |
| *H02J 7/14* | (2006.01) | |
| *H02J 7/35* | (2006.01) | |

(52) U.S. Cl.
CPC ....... *H01M 2/206* (2013.01); *H01M 10/0481* (2013.01); *H02J 7/007* (2013.01); *H01M 2220/20* (2013.01); *H02J 7/0022* (2013.01); *H02J 7/1415* (2013.01); *H02J 7/35* (2013.01); *Y02T 10/7005* (2013.01); *Y02T 10/705* (2013.01); *Y02T 10/7055* (2013.01); *Y10T 29/49108* (2015.01)

(58) Field of Classification Search
CPC ......... H01M 10/0481; H01M 10/7055; H01M 10/7005; H01M 10/705; H01M 2/1077; H01M 2220/20; Y10T 29/49108; Y02T 10/705; Y02T 10/7005

See application file for complete search history.

(56) References Cited

U.S. PATENT DOCUMENTS

| | | | |
|---|---|---|---|
| 2010/0151313 A1* | 6/2010 | Kosugi | H01M 2/1016 429/158 |
| 2011/0097620 A1 | 4/2011 | Kim | |
| 2011/0287299 A1* | 11/2011 | Kim | H01M 2/1077 429/158 |
| 2012/0003526 A1 | 1/2012 | Kume et al. | |
| 2012/0315520 A1* | 12/2012 | Minami | H01M 2/1077 429/82 |
| 2013/0273404 A1 | 10/2013 | Ochi et al. | |
| 2014/0030581 A1 | 1/2014 | Kim | |

FOREIGN PATENT DOCUMENTS

| | | | | |
|---|---|---|---|---|
| JP | 2011-249303 | * | 12/2011 | ............ H01M 2/10 |
| JP | 2012-014962 | | 1/2012 | |
| JP | 2012-022937 | | 2/2012 | |
| WO | 2012/057322 | | 5/2012 | |
| WO | 2013/084941 | | 6/2013 | |

OTHER PUBLICATIONS

International Search Report of PCT application No. PCT/JP2013/005015 dated Nov. 12, 2013.

* cited by examiner

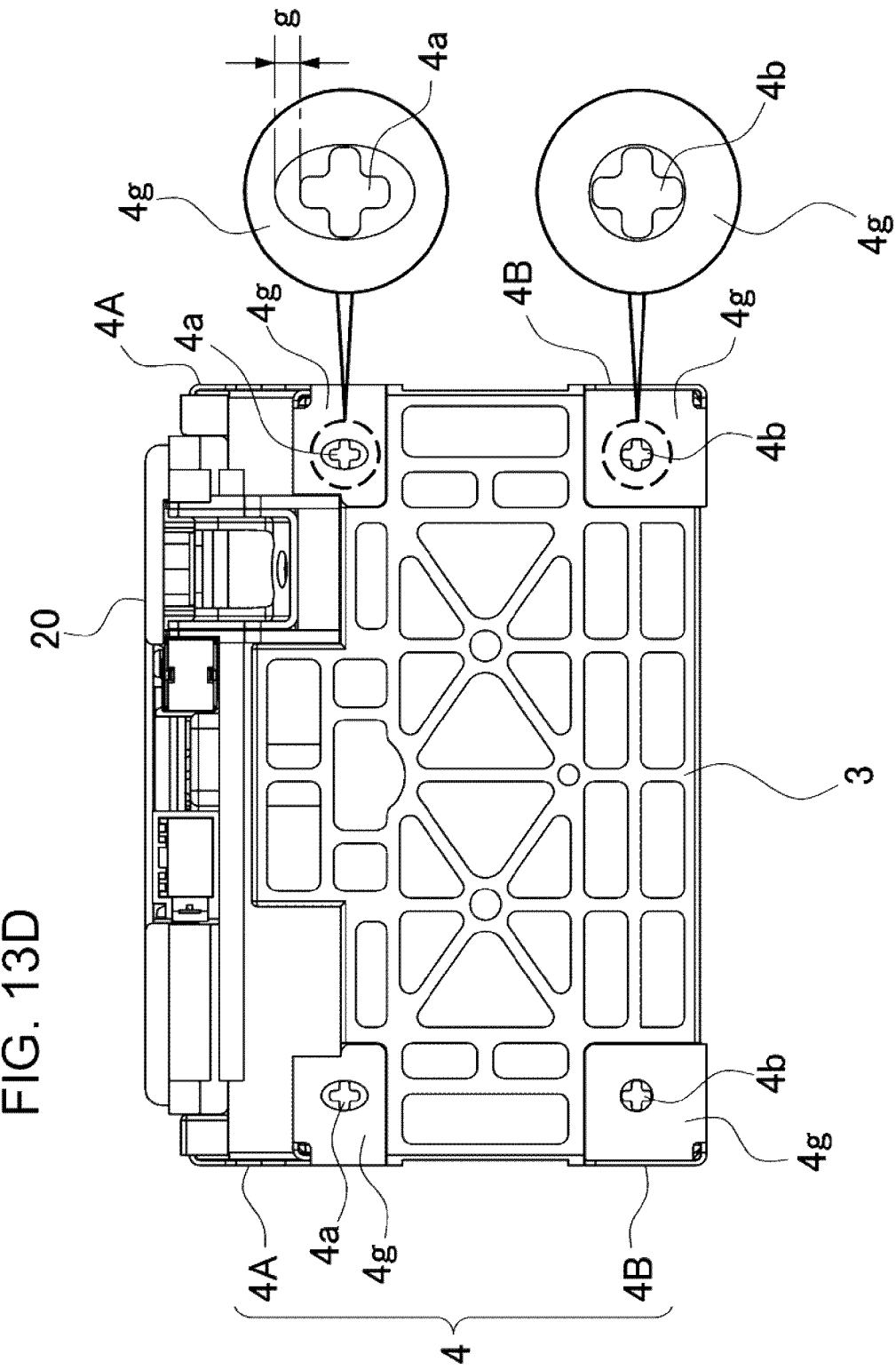

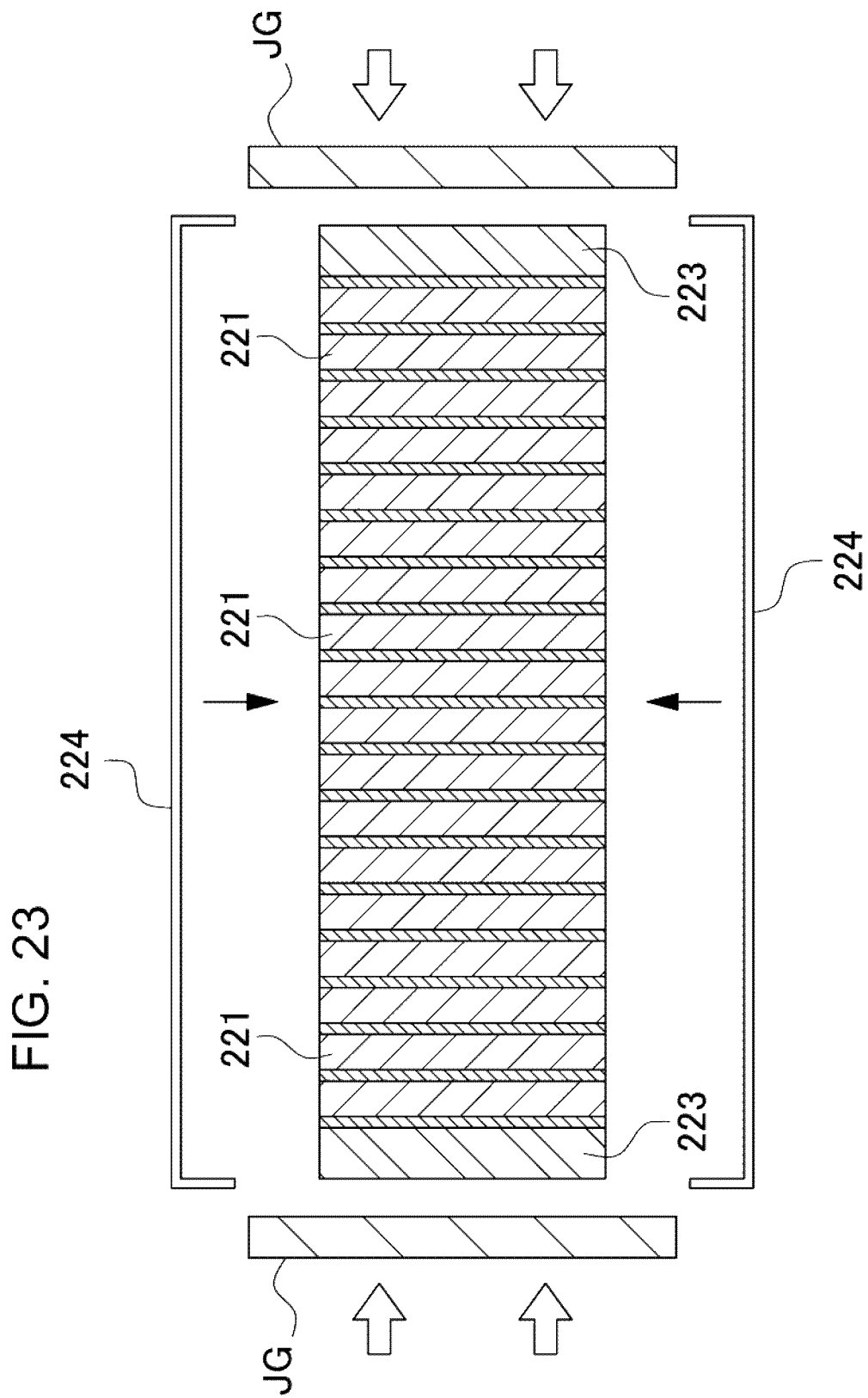

POWER SOURCE DEVICE, VEHICLE PROVIDED WITH POWER SOURCE DEVICE, AND POWER STORAGE DEVICE

CROSS-REFERENCE TO RELATED APPLICATIONS

The present application is a U.S. national stage application of PCT International Application No. PCT/JP2013/005015 filed on Aug. 26, 2013, and claims the benefit of foreign priority of Japanese Patent Application No. 2012-189743 filed on Aug. 30, 2012, the contents all of which are incorporated herein by reference.

TECHNICAL FIELD

The present invention relates to a power source device having a plurality of stacked battery cells, and to a vehicle and a storage battery device equipped with the power source device, in particular, to a power source device for a motor driving installed in an electric vehicle such as a hybrid vehicle, fuel-cell vehicle, electric vehicle, or electric autobike, or to a power source device configured to supply high current such as in a home or industrial power storage application, and a vehicle and a storage battery device equipped with the power source device.

BACKGROUND ART

In a power supply device for a vehicle, in order to make power supplied to a motor driving the vehicle big, output voltage is increased by a lot of rechargeable secondary battery cells connected in series. One instance of a conventional power supply device is shown in an explored perspective view of FIG. 22. In the power supply device shown in this figure, plural battery cells having a rectangular box shape are stacked, and end plates 223 are disposed at the end surfaces of the stacked member. Binding bars 224 bind the end plates 223 each other. The binding bars 224 are made by bending metal boards. Further, a bus bar holder having insulation property is fixed on the upper surface of the stacked member. The bus bar holder of insulation property is sandwiched between the upper surface of the stacked member of the battery cells 221 and the binding bar 224 made of metal, and insulates the battery cells 221 bound by the binding bars 224 from each other without their outer cans conducting. Additionally, a circuit board or the like is fixed on the upper surface of the bus bar holder. The circuit board includes a detecting circuit which detects a cell voltage of each of the battery cells, a circuit which carries out various controls, or the like. Therefore, at the time of assembling the power supply device, after the bus bar holder is fixed in a state that the battery cells 221 are stacked in advance, the binding bars 224 bind the stacked member.

However, such an assembling procedure has a problem that working efficiency is decreased. Namely, in order to fix the bus bar holder, it is necessary to fix the bus bar holder in a state that electrode terminals of the battery cells are coupled by the bus bars. Accordingly, as shown in FIG. 23, both end surfaces of the stacked member are pressed by jig JG, and while this state is held, the bus bar holder is put on the upper surface, and the bus bars are fixed each other by welding or screw. After that, the binding bars 224 are set, and the pressing of the jig JG is released, and then the binding bars 224 are fixed by screw or the like. However, in order to bind the battery stacked member by the binding bars 224, it is necessary to more strongly press the battery stacked member by the jig JG than binding the battery stacked member by the binding bars 224. As a result, when the pressing by the jig JG is released, as the battery stacked member is swollen a little, it happens that fixing positions of each of the bus bar slips. Therefore, a structure to maintain a connecting state, for example, bus bars having enlonged circle holes or track shape holes is necessary. Further, in this way, it is necessary to maintain the pressing by the jig JG until fixing of the bus bars is completed, and as time period of pressing by the jig JG is long, productivity is decreased.

CITATION LIST

Patent Literature

Patent Literature 1: Japanese Laid-Open Patent Publication No. 2012-22937

SUMMARY OF THE INVENTION

The present disclosure is developed for the purpose of solving such drawbacks. One non-limiting and explanatory embodiment provides a power supply device, and a vehicle and a storage battery device equipped with the power supply device in which assembling work can be effectively carried out.

In one aspect of the present disclosure, a power supply device comprises plural battery cells having a rectangular box shape and electrode terminals, a binding member binding a battery stacked member stacking the battery cells, bus bars connecting electrode terminals of the battery cells, and an insulating bus bar holder covering the upper surface of the battery stacked member, and the binding member binds the battery stacked member at the side surface and upper surface thereof, and the binding member comprises a side covering portion covering the side surface of the battery stacked member, and an upper covering portion covering the upper surface of the battery stacked member, and the bus bar holder is divided into an intermediate holder located at the intermediate portion, and side surface holders located at the side surfaces of both sides of the intermediate holder, and the side surface holder and the intermediate holder are press-fitted by a press-fitting structure. Accordingly, by dividing the binding member, as the intermediate holder can be fixed in a state that the binding member binds the battery stacked member including the side surface holder in advance, the pressure by the jig is early released, and then working efficiency of assembling is improved.

In other aspect of the power supply device related to the present disclosure, the press-fitting structure comprises, at the connecting surfaces between the intermediate holder and the side surface holder, a hook portion projecting from one surface, and an engaging portion engaged with the hook portion at the other surface. Accordingly, in a state that the side surface holder is fixed to the battery stacked member in advance, after that, the intermediate holder is easily fixed to the side surface holders.

In other aspect of the power supply device related to the present disclosure, the bus bar holder is extended in the stacking direction of the battery cells, and is divided into the intermediate holder and the side holder in the extended direction.

In other aspect of the power supply device related to the present disclosure, the bus bar holder is extended in the stacking direction of the battery cells, and is divided into the intermediate holder and the side holder in the extended direction.

In other aspect of the power supply device related to the present disclosure, further the power supply device comprises an insulating sheet interposed between the binding member and the battery stacked member. Accordingly, even though the binding member is made of conducting material, such as, metal board or the like, conducting of the outer cans of the battery cells can be prevented, and safety can be improved.

In other aspect of the power supply device related to the present disclosure, the side surface holder has a C-shaped slit in the sectional view, and opens toward side such that the end edge of the upper covering portion is inserted into the opening of the C-shaped slit. Accordingly, the side surface holder is sandwiched and fixed between the binding member and the battery stacked member, and the upper surface of the binding member is covered by the side surface holder, and the binding member can be prevented from convexly curving.

In other aspect of the power supply device related to the present disclosure, the binding member has an intermediate fixing projection projecting toward the intermediate holder side at the intermediate portion thereof, and the intermediate holder has an intermediate engaging portion engaged to the intermediate fixing projection at a position corresponding to the intermediate fixing. Accordingly, the binding member can be prevented from convexly curving at the intermediate portion.

In other aspect of the power supply device related to the present disclosure, the intermediate fixing projection comprises a part of the binding member which extends beyond the side surface holder, and the intermediate fixing projection is a bending board which is bent so as to project toward the intermediate holder, and the intermediate engaging portion is a slit into which the bending board is inserted. Accordingly, the intermediate fixing projection can be integrally made with the binding member, and the fixing structure can be simplified.

In other aspect of the power supply device related to the present disclosure, the side surface holder has a recess portion which holds the bending board. Accordingly, the bending board is held and positioned by the recess portion.

In other aspect of the power supply device related to the present disclosure, the binding member has one or more binding hole to open. Accordingly, when the battery cell are swollen or expanded and the length of the battery stacked member is elongated, the deformation of the binding hole reduces excessive load on connecting portions of the binding member and the end plates.

In other aspect of the power supply device related to the present disclosure, the bus bar holder has positioning guides in which the bus bars are disposed, and in each of the positioning guides, an insulating portion having a lattice shape is provided.

In other aspect of the power supply device related to the present disclosure, the battery stacked member has insulating spacers interposing between the battery cells, the spacer has a spacer hole portion at the center portion thereof. Accordingly, even though the center portion of the battery cells are swollen or expanded, the spacer hole portion can absorb such swell or expansion.

In other aspect of the power supply device related to the present disclosure, the spacer hole portion of the spacer is a through hole. Accordingly, the spacer hole portion can be easily made in the spacer.

In other aspect of the power supply device related to the present disclosure, further the power supply device comprises a circuit board including an electric circuit to monitor the battery cells, which is fixed on the upper surface of the bus bar holder, and the bus bar holder has a circuit board positioning boss to fix the circuit board at the center portion thereof, and the circuit board positioning boss has holding projections to hold the circuit board at the periphery thereof. Accordingly, the circuit board can be positioned and fixed to the upper surface of the bus bar.

In other aspect of the power supply device related to the present disclosure, further the power supply device comprises a holder cover which covers the upper surface of the circuit board, and the circuit board positioning boss has a screw hole to fix the holder cover and the bus bar holder by screw. Accordingly, by the circuit board positioning boss, the circuit board and the holder cover are fixed at the same time.

A electric vehicle equipped with the power supply device, in addition to the power supply device comprises an electric motor being energized by electric power that is supplied from the power supply device, a vehicle body having the power supply device and the electric motor; and a wheel being driven by the electric motor, and driving the vehicle body.

A storage battery device equipped with the power supply device comprises a power supply controller controlling charging and discharging of the power supply device, and the power supply device is charged with an external power by the power supply controller, and charging of the power supply device is controlled by the power supply controller.

In a method for manufacturing a power supply device, the power supply device comprises plural battery cells having a rectangular box shape and electrode terminals, an binding member binding a battery stacked member stacking the battery cells, bus bars connecting electrode terminals of the battery cells, and an insulating bus bar holder covering the upper surface of the battery stacked member. The method comprises providing the divided bus bar comprising an intermediate holder at the center portion in the bus bar holder, and side surface holders at the side surfaces of in the bus bar holder; binding the upper surface of the side surface holders by the binding member in a state that the side surface holders are disposed at the upper edge portions of the battery stacked member, press-fitting and fixing the intermediate holder between the side surface holders by using the press-fitting structure provided at the connecting surface between the intermediate holder and the side surface holder; and fixing the bus bars which are disposed at positioning guides disposing the bus bars to the electrode terminals of the battery cells.

BRIEF DESCRIPTION OF DRAWINGS

FIG. 13D is a plan view showing the structure of engaging the binding members to the end plate shown in FIG. 13A.

FIG. 23 is a schematic view showing fixing binding bars with jig pressing.

DESCRIPTION OF EMBODIMENTS

Hereinafter, the embodiment of the present invention will be described referring to drawings. However, the following embodiments illustrate a power supply device, a vehicle and a storage battery device equipped with the power supply device, and a method for manufacturing the power supply device which are aimed at embodying the technological concept of the present invention, and the present invention is not limited to the power supply device, the vehicle and the storage battery device equipped with the power supply device, and the method for manufacturing the power supply device described below.

In particular, as long as specific descriptions are not provided, it is not intended that the claims be limited to sizes, materials, shapes, and relative arrangements of constitutional members described in the embodiments, which are mere descriptive examples. It is noted that the magnitude or positional relation of the members illustrated in each diagram is sometimes grandiloquently represented, in order to clarify the description. Furthermore, in the description below, identical names and reference numbers represent identical or homogeneous members, and detailed descriptions are appropriately omitted. Moreover, mode may be applied where each element constituting the present invention constitutes a plurality of elements with the use of the same member, thereby serving the plurality of elements with the use of one member, or, in contrast, mode may be realized where a function of the one member is shared by a plurality of members. Also, a portion of examples and the content described in the embodiments can be applied to other examples and another embodiment.

(Embodiment 1)

Figure 1:
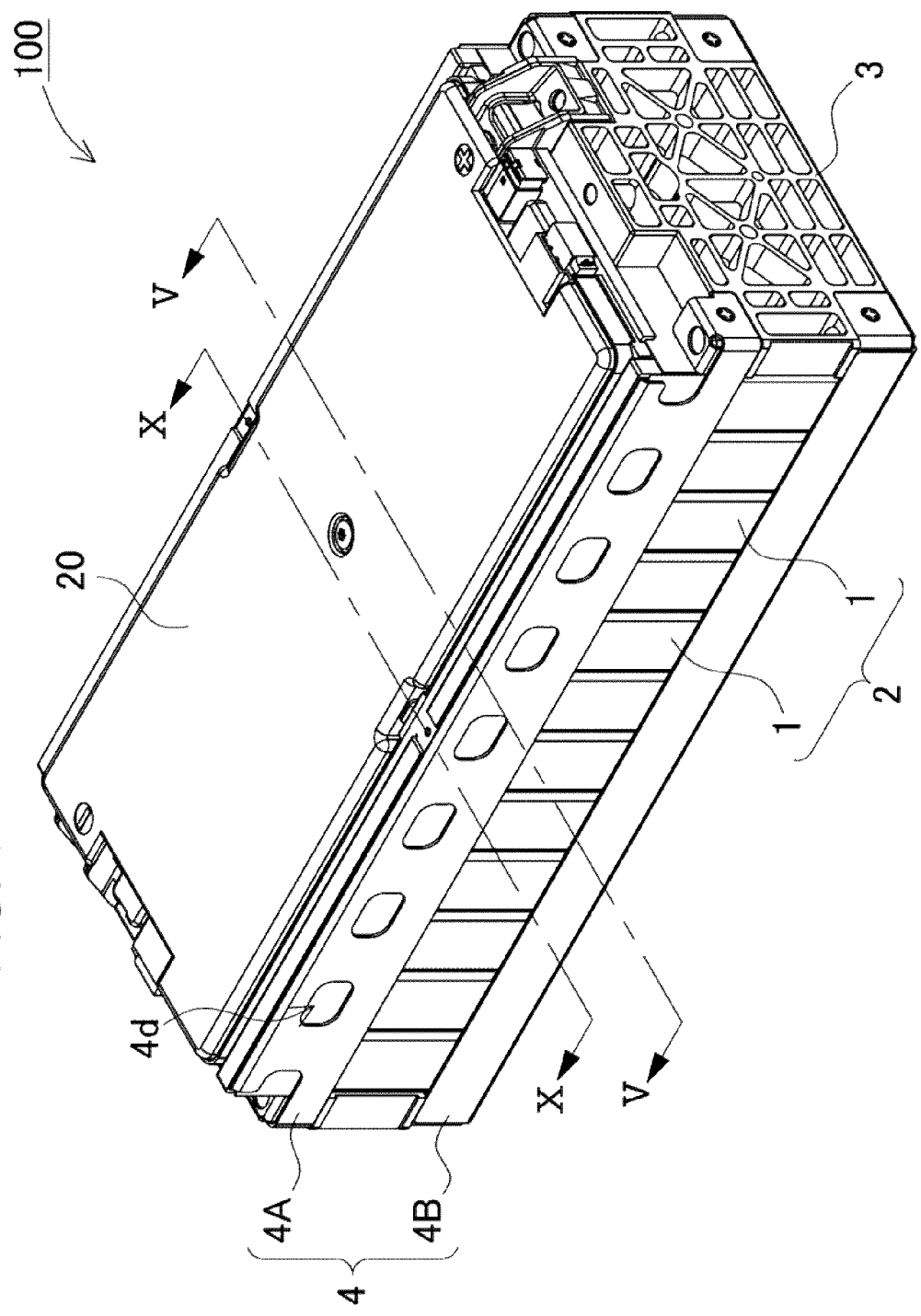
FIG. 1 is a perspective view showing a power supply device related to an embodiment 1 of the present invention.
Figure 2:
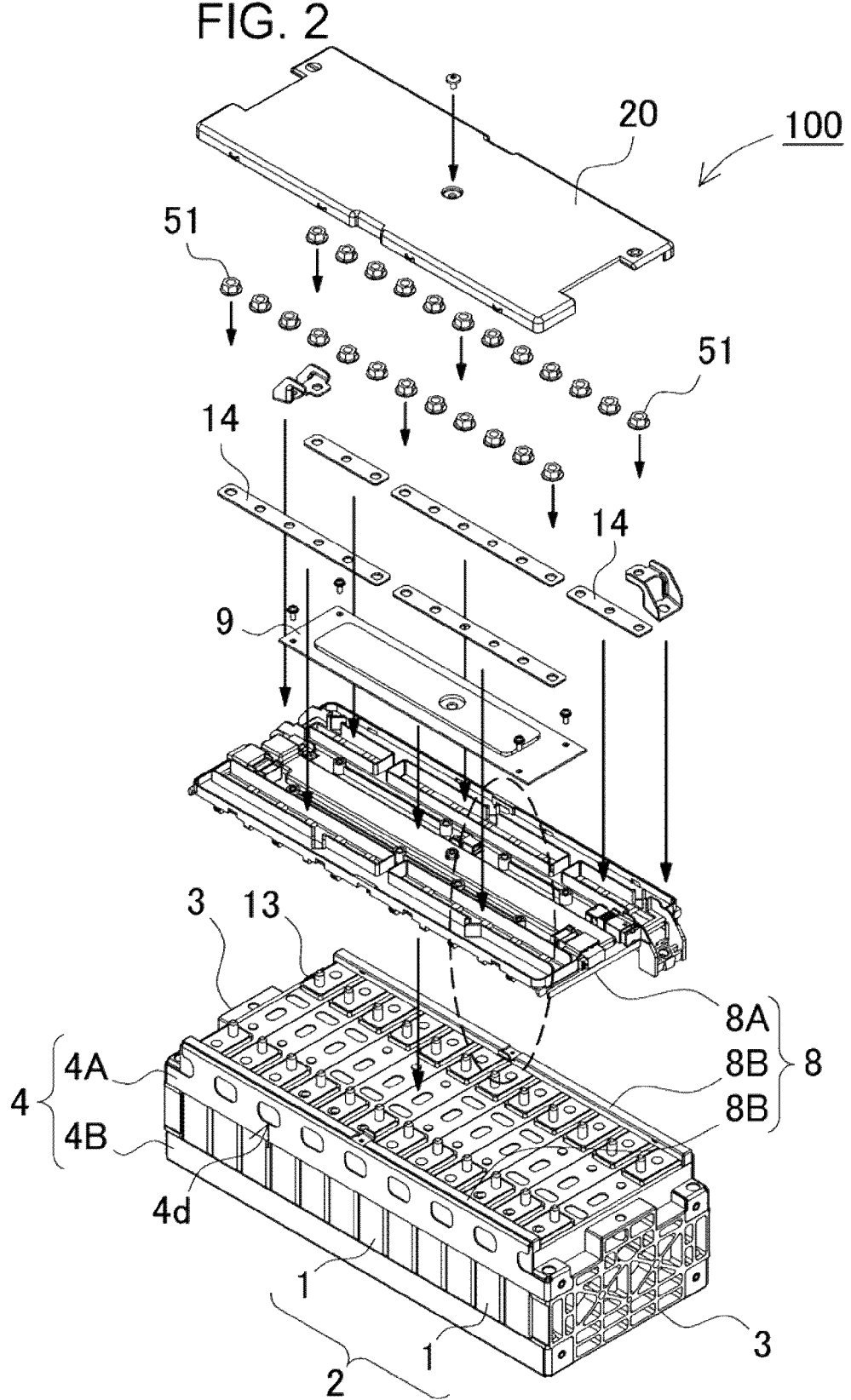
FIG. 2 is an explored perspective view of the power supply device in FIG. 1.
Figure 3:
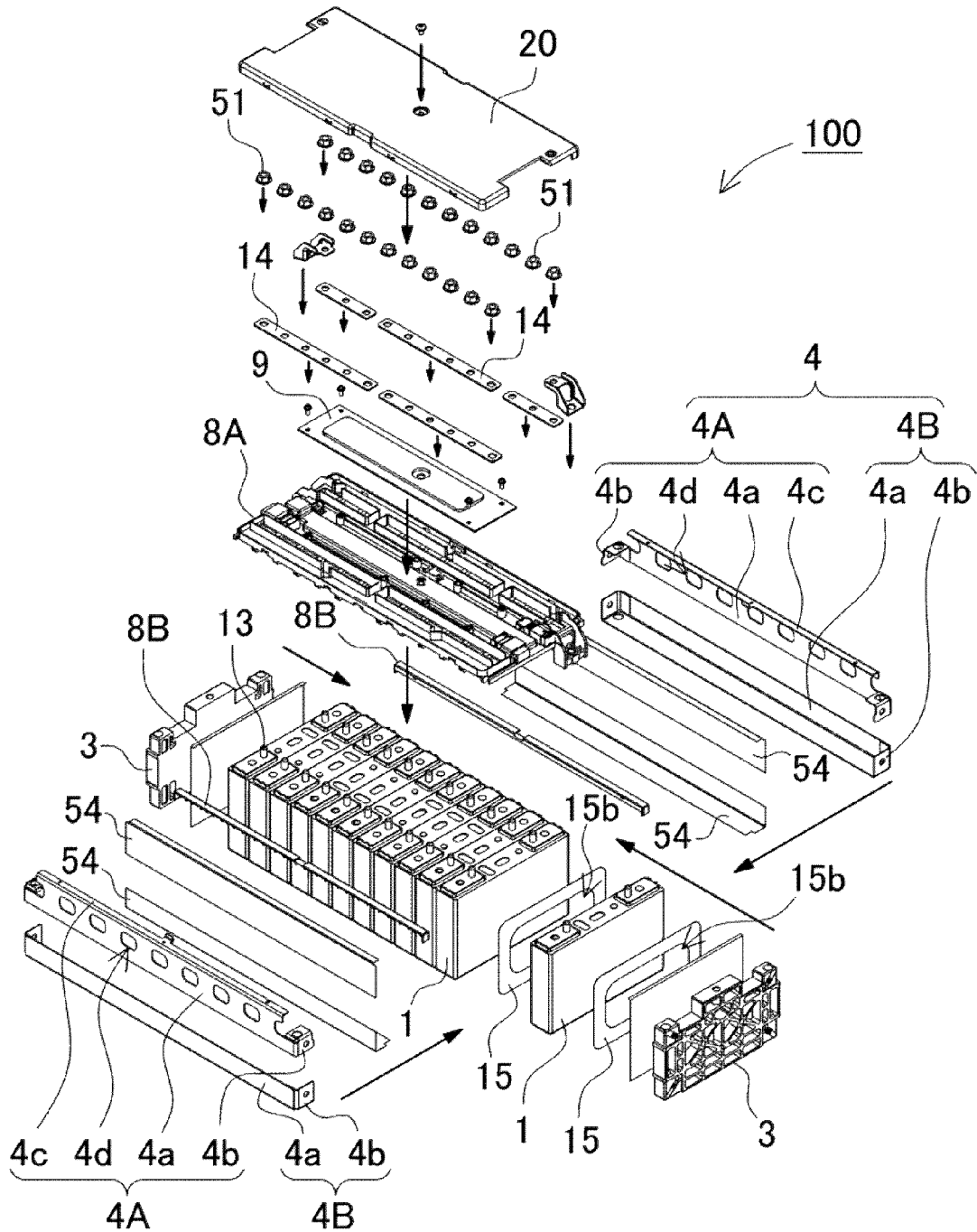
FIG. 3 is a further explored perspective view of the power supply device in FIG. 2.
Figure 5:
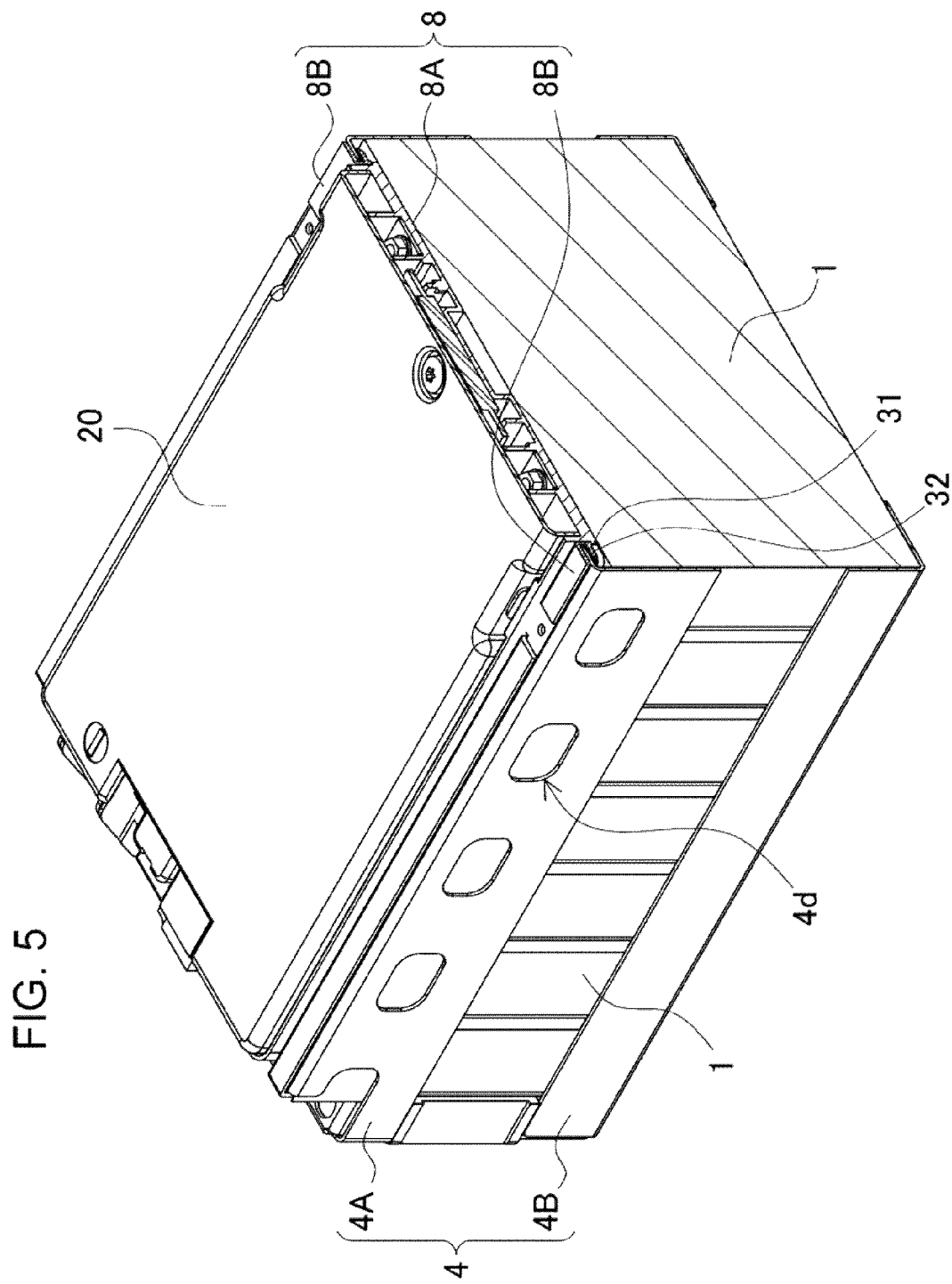
FIG. 5 is a sectional perspective view along a line V-V in FIG. 1.
Figure 6:
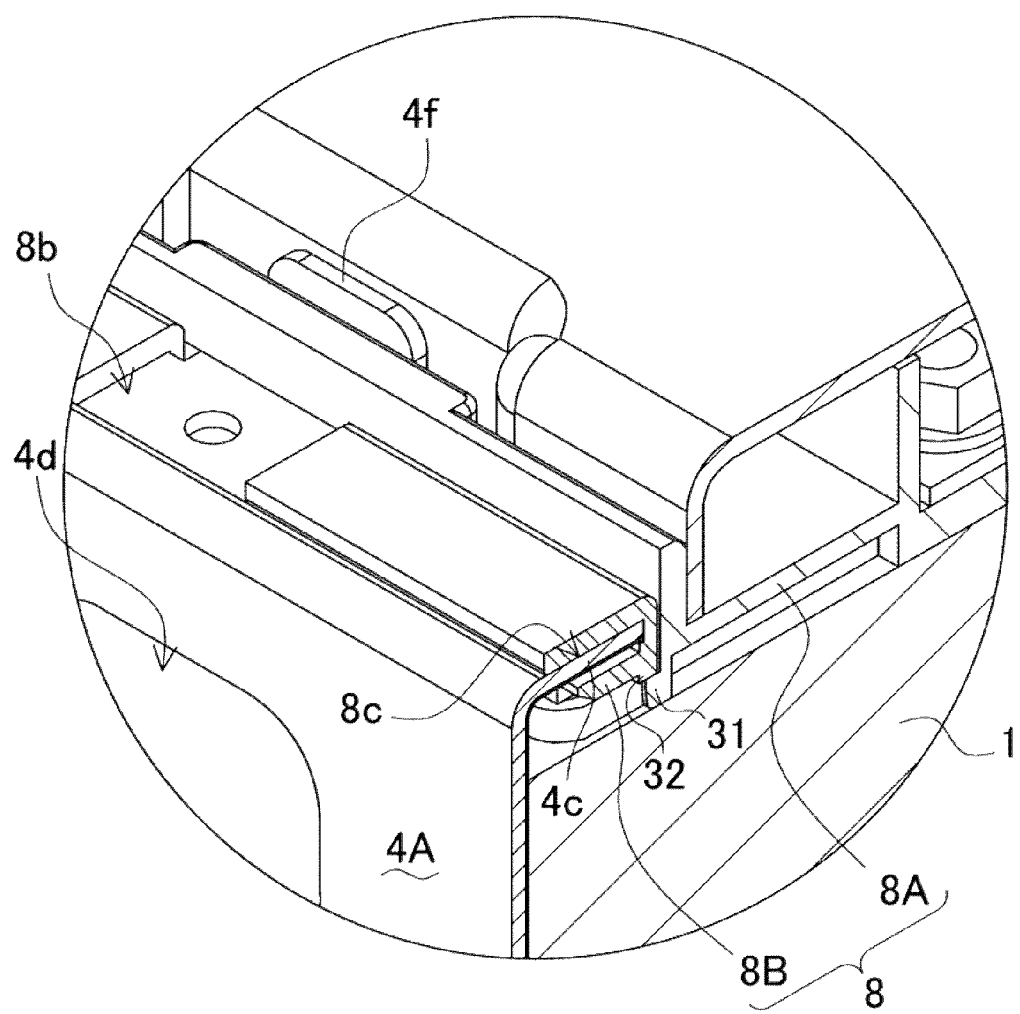
FIG. 6 is a main portion enlarged view of FIG. 5.
Figure 7:
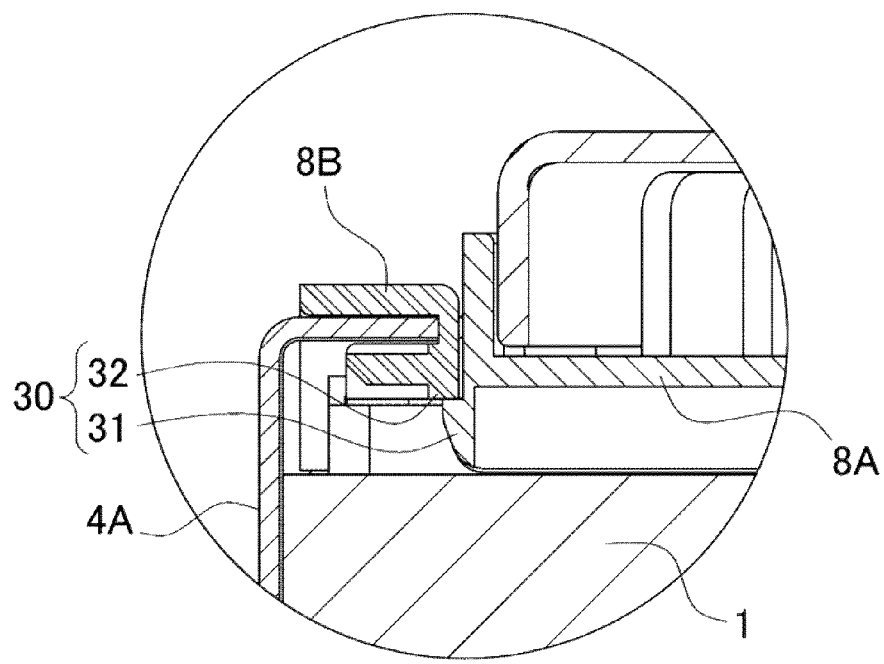
FIG. 7 is a schematic sectional view showing one instance of a press-fitting structure of FIG. 5.
Figure 8:
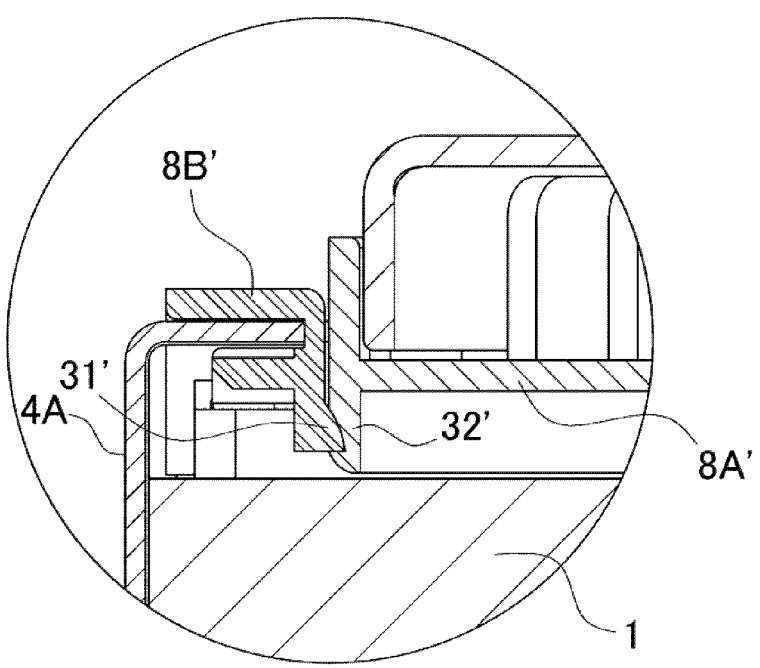
FIG. 8 is a schematic sectional view showing a press-fitting structure related to an embodiment 2.
Figure 9:
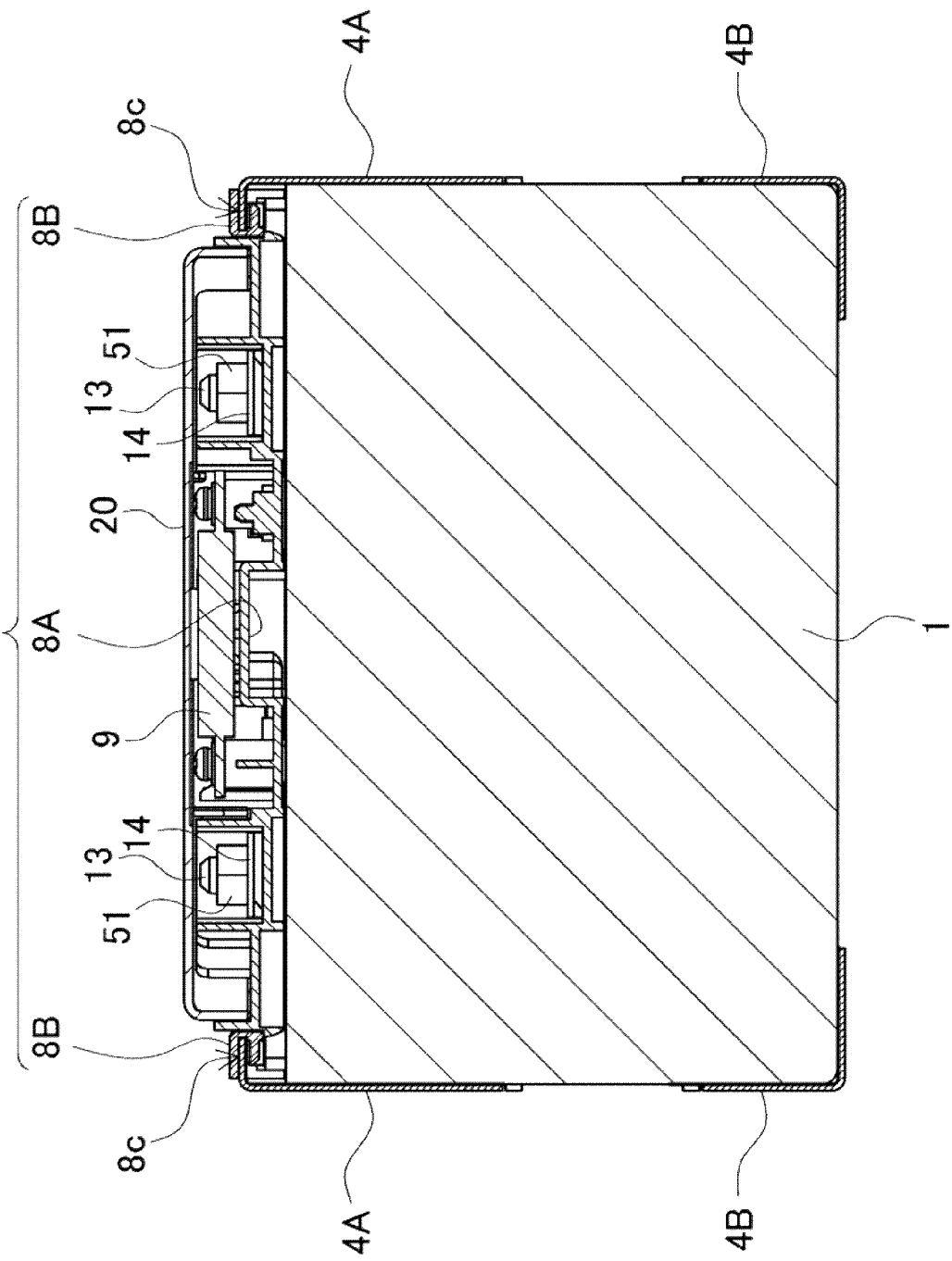
FIG. 9 is a sectional view of the power supply device.
Figure 10:
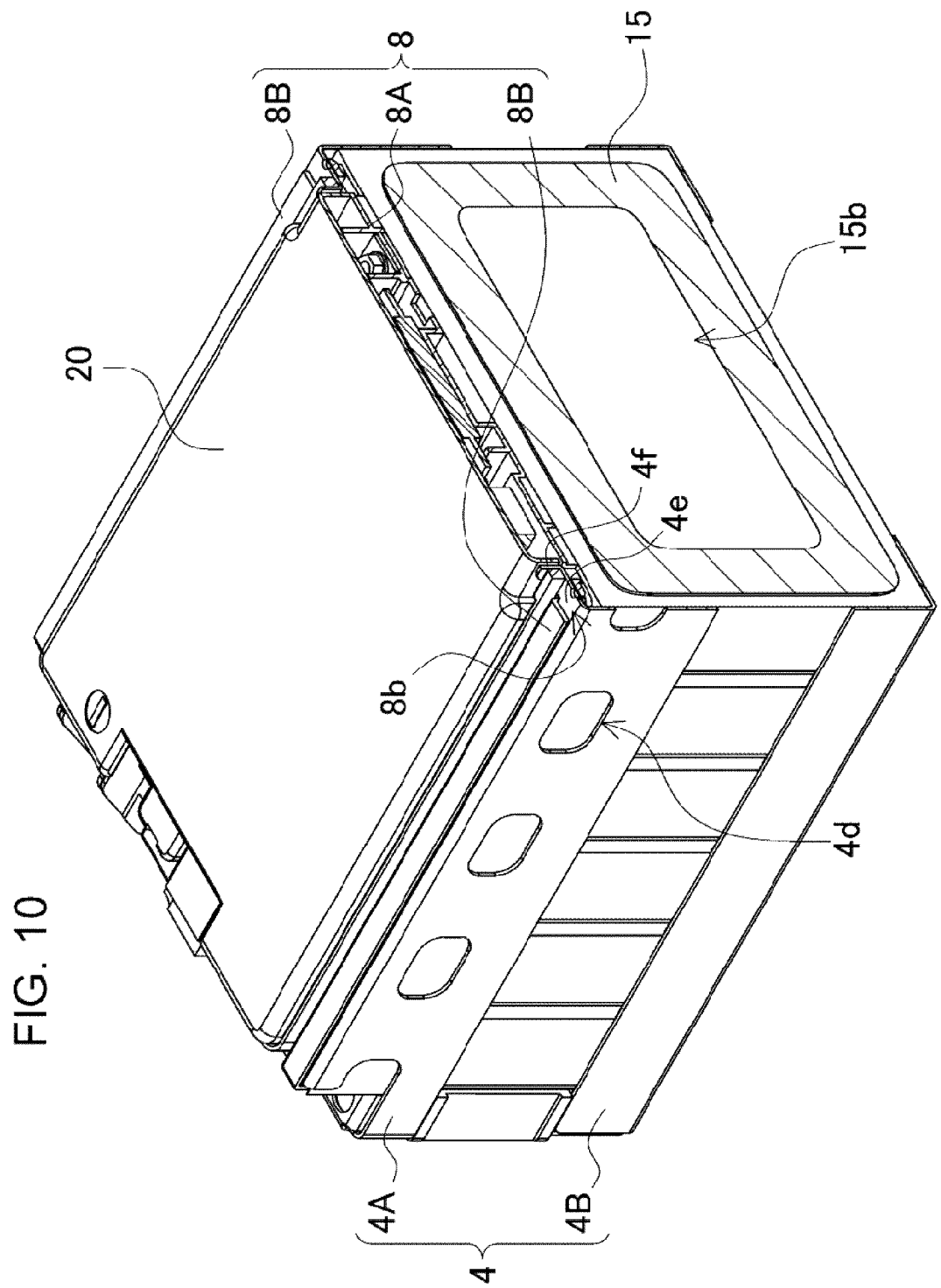
FIG. 10 is a sectional perspective view along a line X-X in FIG. 1.
Figure 11:
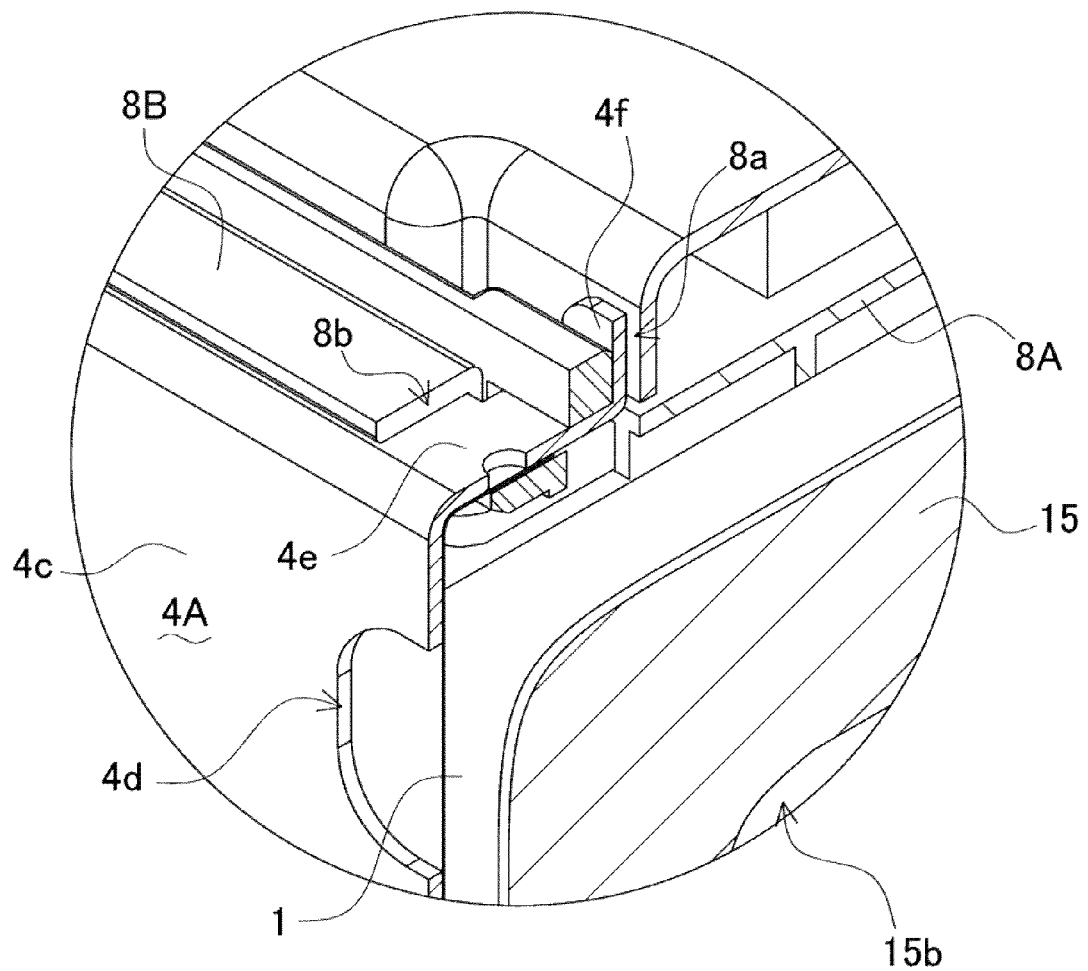
FIG. 11 is a main portion enlarged view of FIG. 10.
Figure 12:
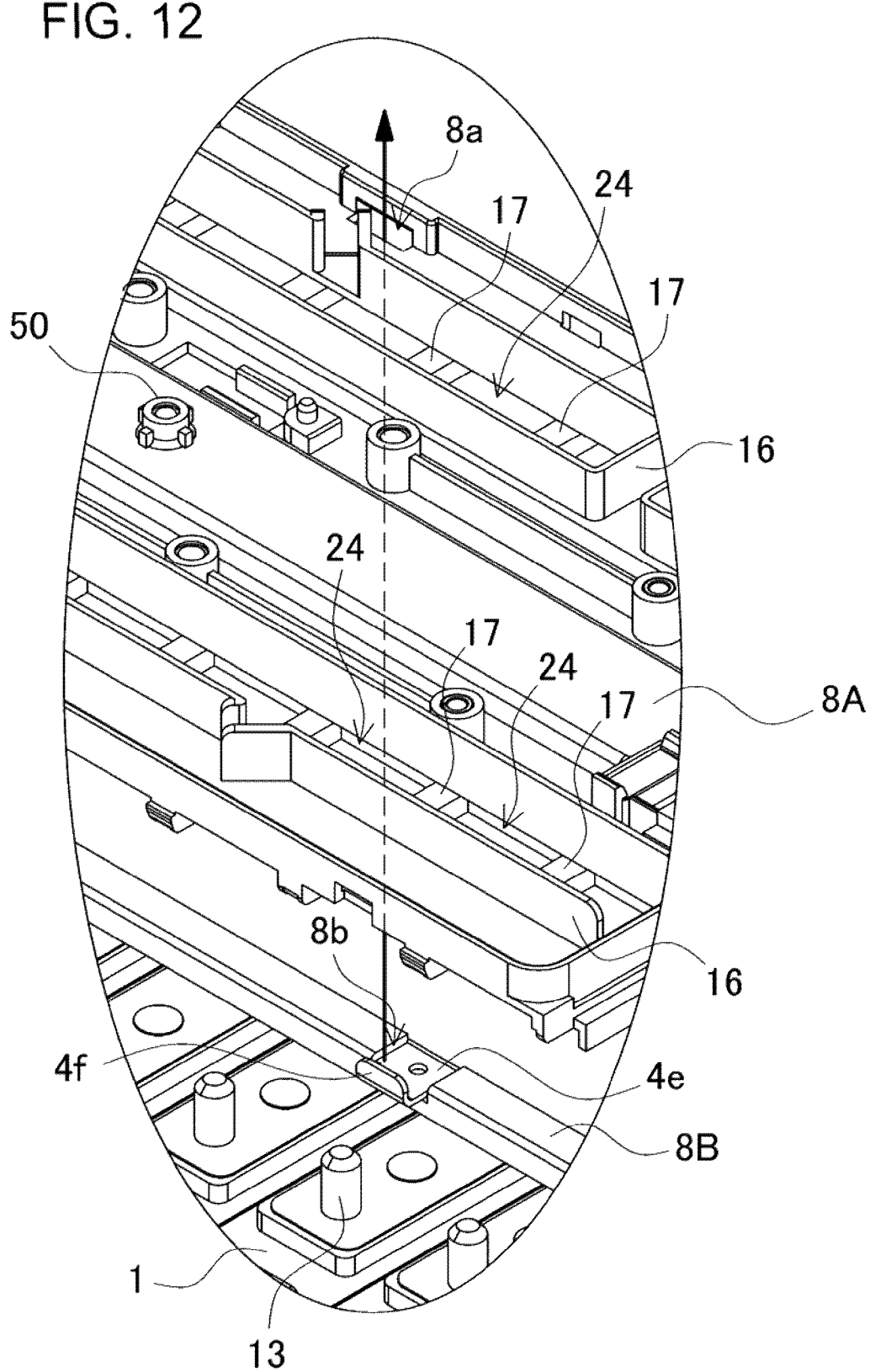
FIG. 12 is an enlarged explored perspective view showing an encircled portion with a dashed line of an intermediate fixing structure in FIG. 2.
Figure 13A:
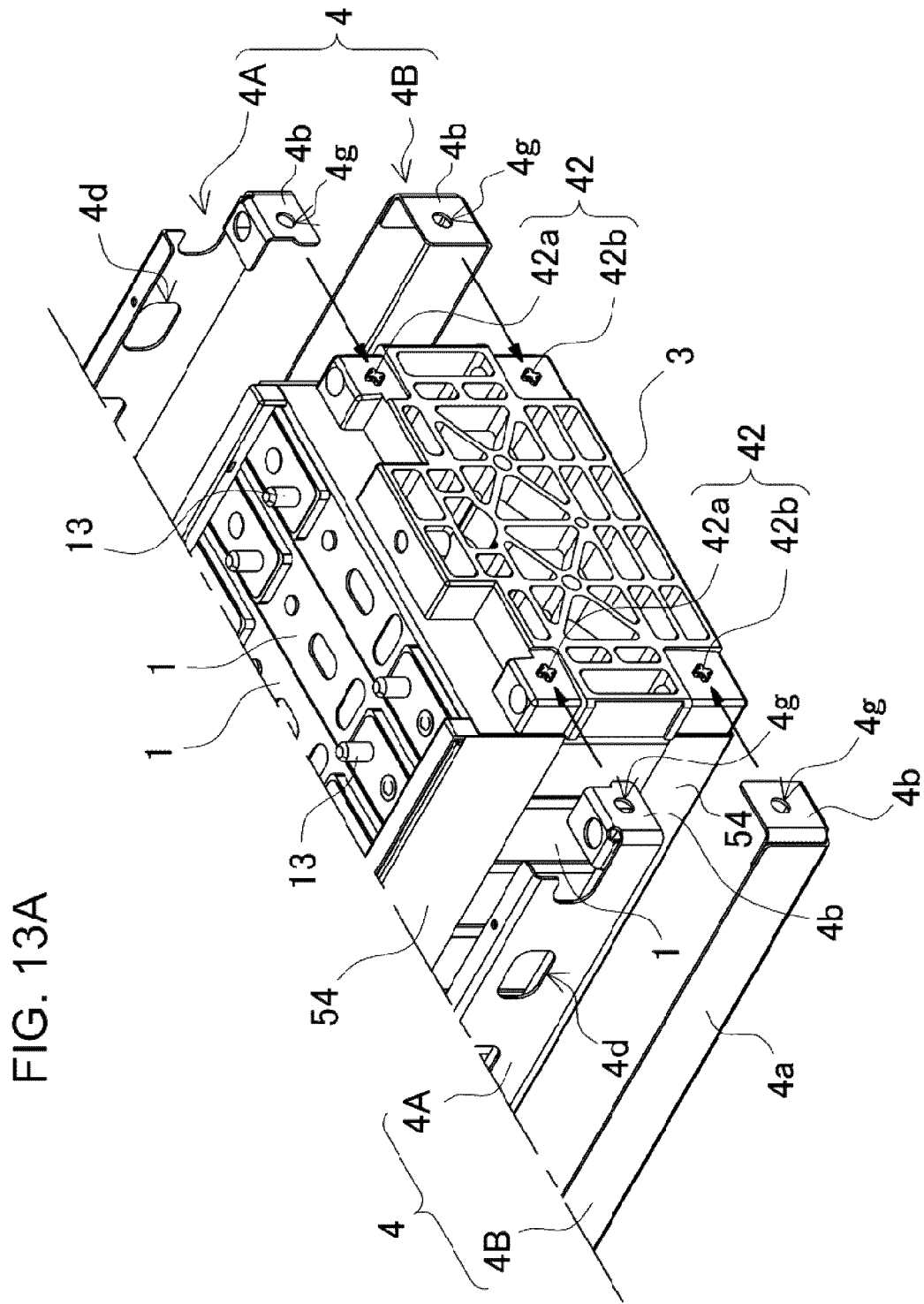
FIG. 13A is an explored perspective view showing a structure of engaging binding members to end plates.
Figure 13B:
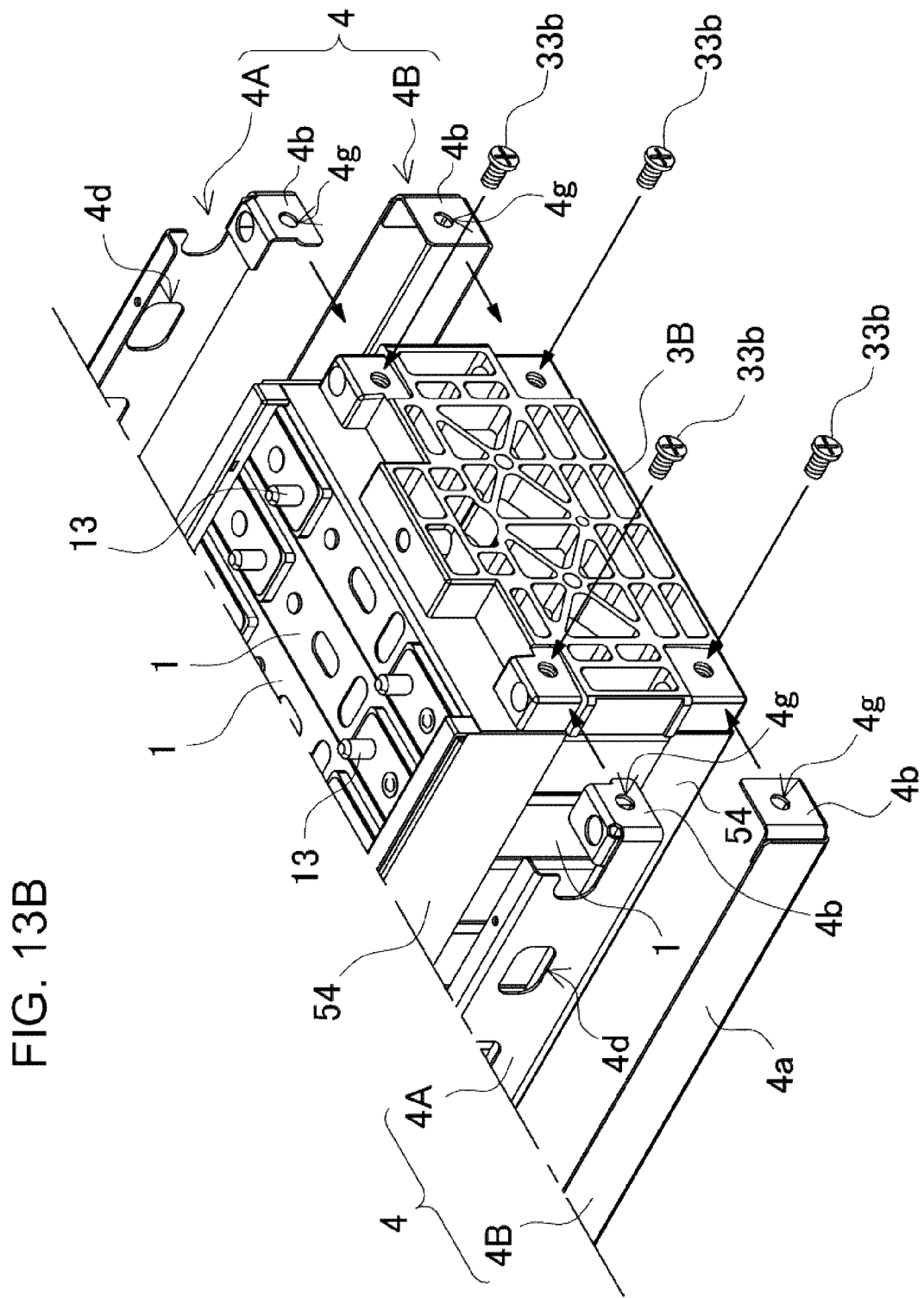
FIG. 13B is an explored perspective view showing a structure of engaging binding members to end plates related to an embodiment 3.
Figure 13C:
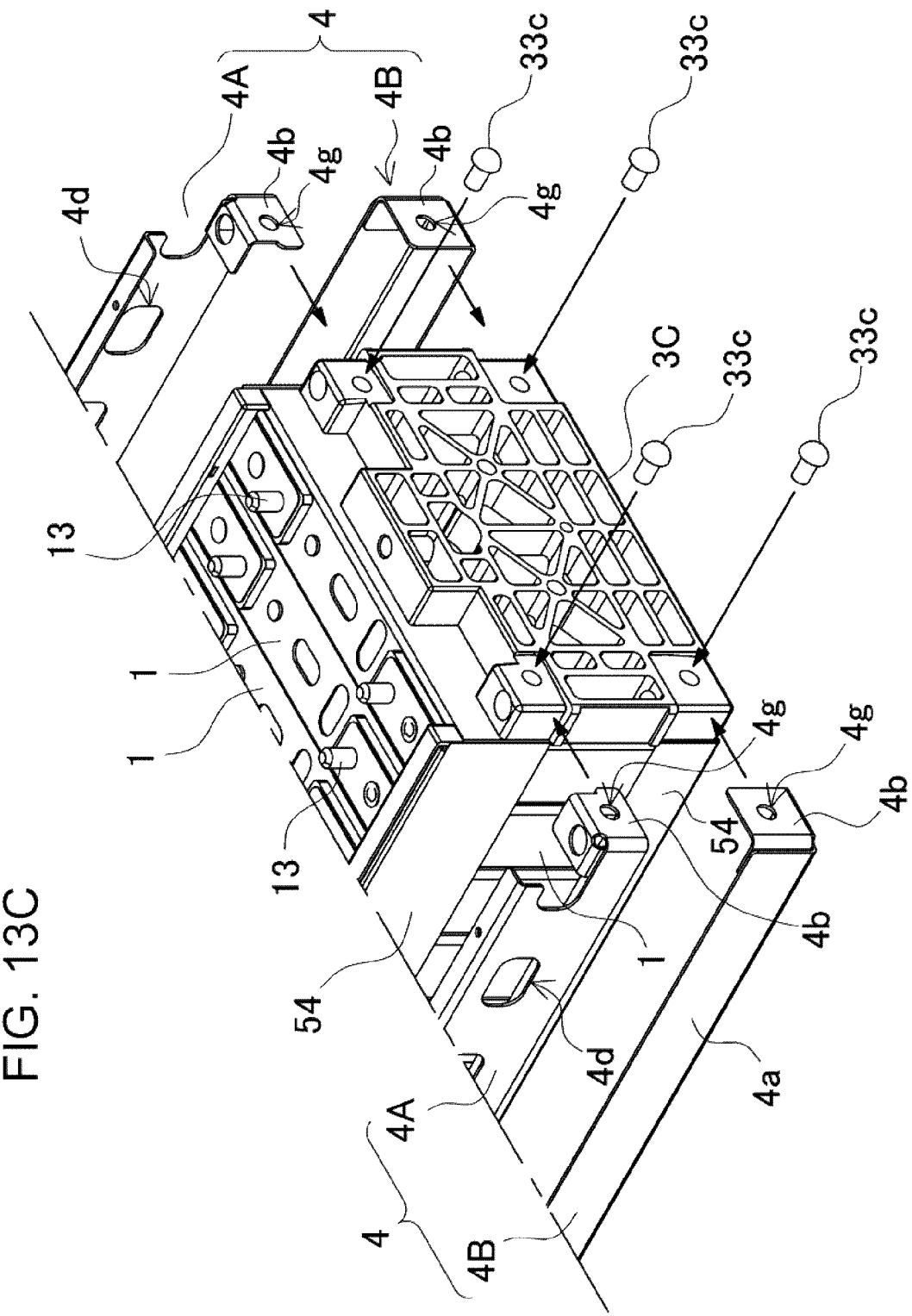
FIG. 13C is an explored perspective view showing a structure of engaging binding members to end plates related to an embodiment 4.
Figure 13E:
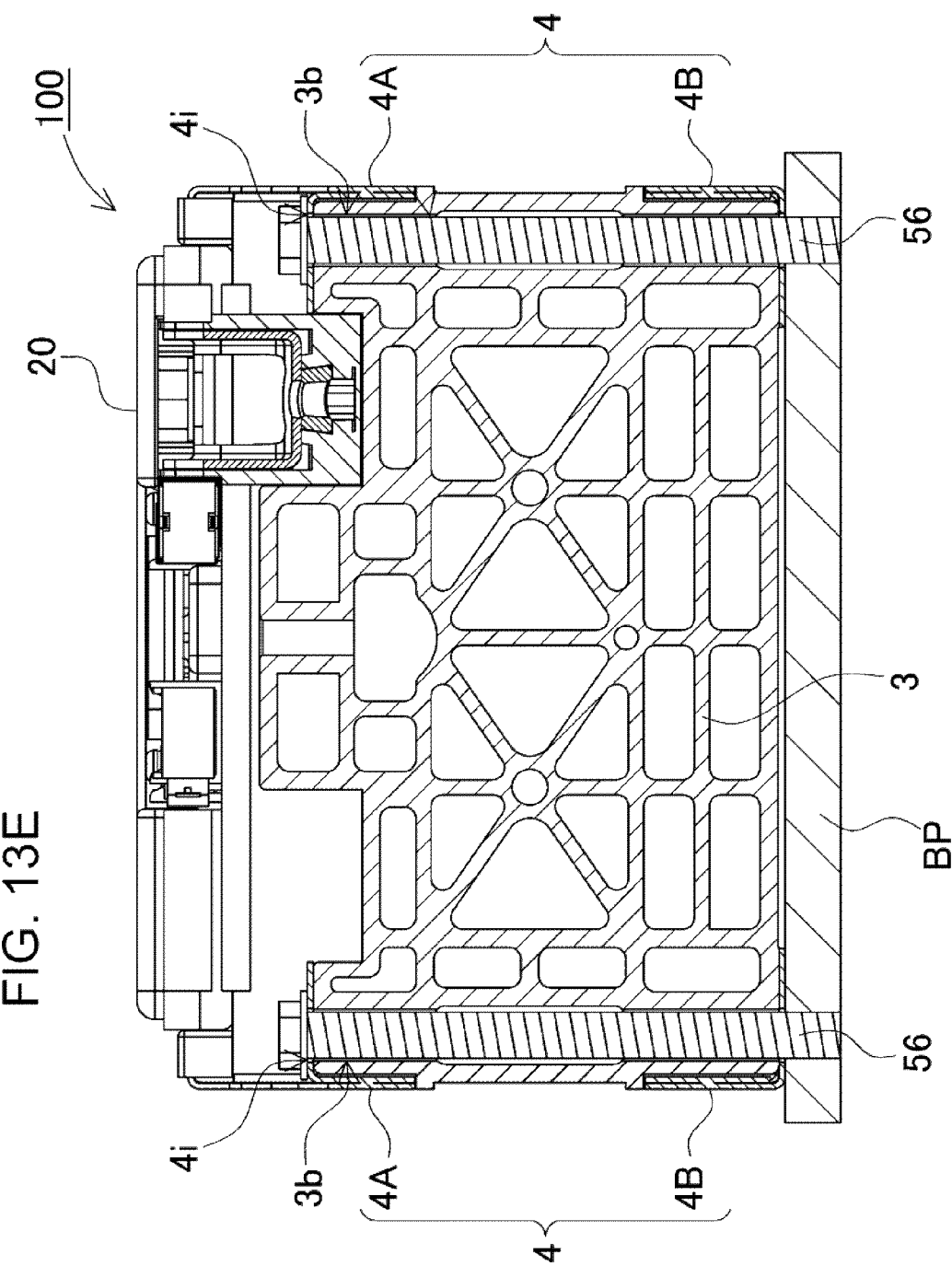
FIG. 13E is a vertical sectional view showing a state that the end plate of FIG. 13D is fixed to a base plate.
Figure 14:
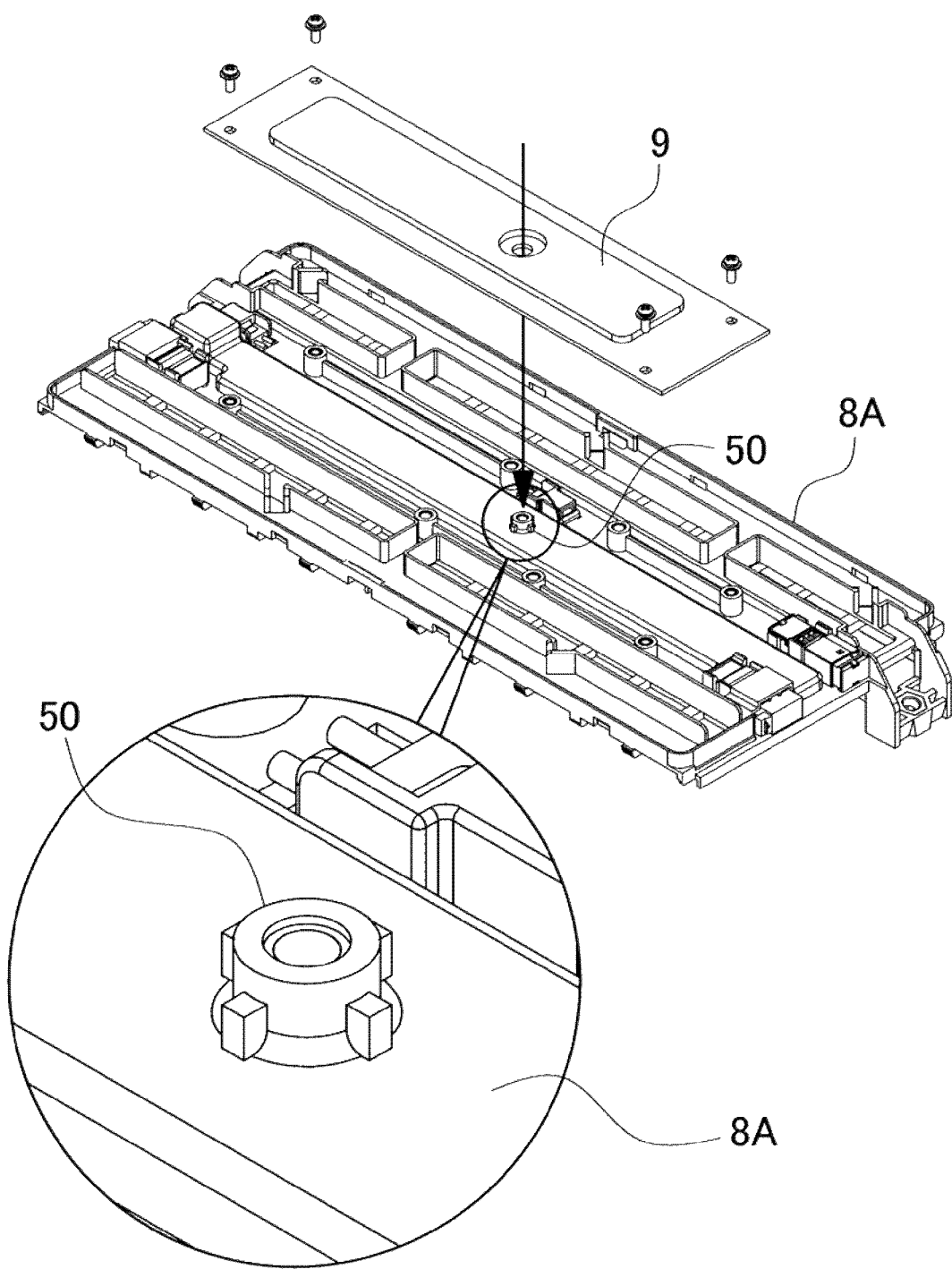
FIG. 14 is an explored perspective view and a main portion enlarged view showing a state that a circuit board is fixed to a bus bar holder.
Figure 15:
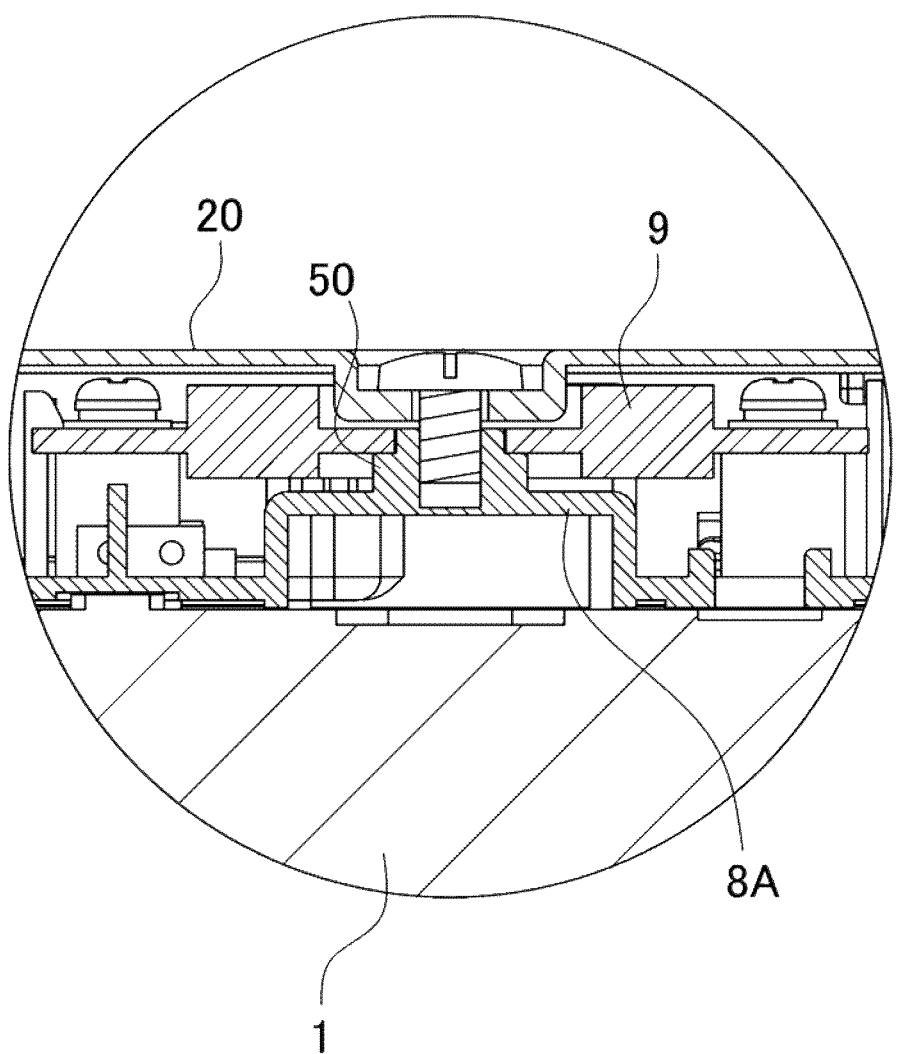
FIG. 15 is a schematic view showing a fixing portion of the circuit board.

A power supply device 100 related to an embodiment 1 of the present invention is shown in FIG. 1 to FIG. 15. FIG. 1 is a perspective view showing the power supply device 100 related to an embodiment 1, and FIG. 2 is an explored perspective view of the power supply device 100 in FIG. 1, and FIG. 3 is a further explored perspective view of the power supply device 100 in FIG. 2, and FIG. 5 is a sectional perspective view along a line V-V in FIG. 1, and FIG. 6 is a main portion enlarged view of FIG. 5, and FIG. 7 is a schematic sectional view showing one instance of a press-fitting structure 30 of FIG. 5, and FIG. 8 is a schematic sectional view showing a press-fitting structure related to another embodiment 2, and FIG. 9 is a sectional view of the power supply device 100, and FIG. 10 is a sectional perspective view along a line X-X in FIG. 1, and FIG. 11 is a main portion enlarged view of FIG. 10, and FIG. 12 is an enlarged explored perspective view showing an encircled portion with a dashed line of an intermediate fixing structure in FIG. 2, and FIG. 13A is an explored perspective view showing a structure of engaging binding members 4 to end plates 3, and FIG. 13B is an explored perspective view showing a structure of engaging binding members to end plates related to an embodiment 3, and FIG. 13C is an explored perspective view showing a structure of engaging binding members to end plates related to an embodiment 4, and FIG. 13D is a plan view showing the structure of engaging the binding members to the end plate shown in FIG. 13A, and FIG. 14 is an explored perspective view and a main portion enlarged view showing a state that a circuit board 9 is fixed to a bus bar holder 8, and FIG. 15 is a schematic view showing a fixing portion of the circuit board 9. The power supply device 100 shown in these figures comprises plural battery cells 1, spacers 15 interposing between the battery cells 1, the end plates 3 which are each disposed at each end surface of a battery stacked member 2 in which the battery cells 1 and the spacers 15 are alternately stacked, a binding member 4 which binds the end plates 3, the bus bar holder 8 which is fixed on the upper surface of the battery stacked member 2, and bus bars 14 which connect electrode terminals 13 of the battery cells 1 to each other.

The end plates 3 are made of high rigidity material, for example, metal or the like, in order that the end plates 3 bind the battery stacked member 2 in a stacked state. Further, the binding member 4 is similarly made of metal or the like as high rigidity material. Here, the metal board is bent in a U-shaped cross-section, and end portions of the binding member 4 are fixed to the end plates 3 by screw or the like. This binding member 4 binds the side surface of the battery stacked member 2. Further, the binding member 4 also has a structure which presses the upper surface of the battery stacked member 2. Namely, the binding member 4 binds in the stacked state, and trues up the upper surfaces of the battery stacked member 2, namely the upper surfaces of the battery cells 1 as the nearly flat surface by pressing from the upper surface.

(Bus Bar Holder 8)

The bus bar holder 8 covers the upper surface of the battery stacked member 2. This bus bar holder 8 holds the bus bars 14 connecting electrode terminals 13 of the battery cells 1, and also insulates the bus bars 14 from the battery cells 1 for preventing unnecessary conducting between those. Therefore, the bus bar holder 8 is made of insulating material. In this instance, it is made of resin, for example, PPE or the like.

(Intermediate holder 8A, Side surface holder 8B)

The bus bar holder 8 extends in the stacking direction of the battery cells 1. As shown in the explored perspective view of FIG. 3 and the plan view of FIG. 4, this bus bar holder 8 is divided into an intermediate holder 8A located in the intermediate portion, and side surface holders 8B located at the side surfaces of both sides of the intermediate holder 8A in the direction crossing the extending direction. Thus, by dividing the bus bar holder 8 into 3 parts, in a state that the side surface holders 8B are fixed on the edge portions of the upper surface, the intermediate holder 8A are press-fitted, coupled, and fixed between the side surface holders 8B, and then it improves working efficiency of the assembling procedure of the power supply device.

(Press-fitting Structure 30)

Further, the intermediate holder 8A and the side surface holder 8B has a press-fitting structure 30 press-fitting each other at the joining surfaces between them. Concretely, as shown in FIG. 5 to FIG. 7, a hook portion 31 of a hook shape projecting from a wall surface of the intermediate holder 8A, and an engaging portion 32 engaged with the hook portion 31 at the position corresponding to the hook portion 31 in each of the side surface holder 8B are provided. By press-fitting those, the intermediate holder 8A and the side surface holder 8B are fixed.

(Hook Portion 31)

Figure 4:
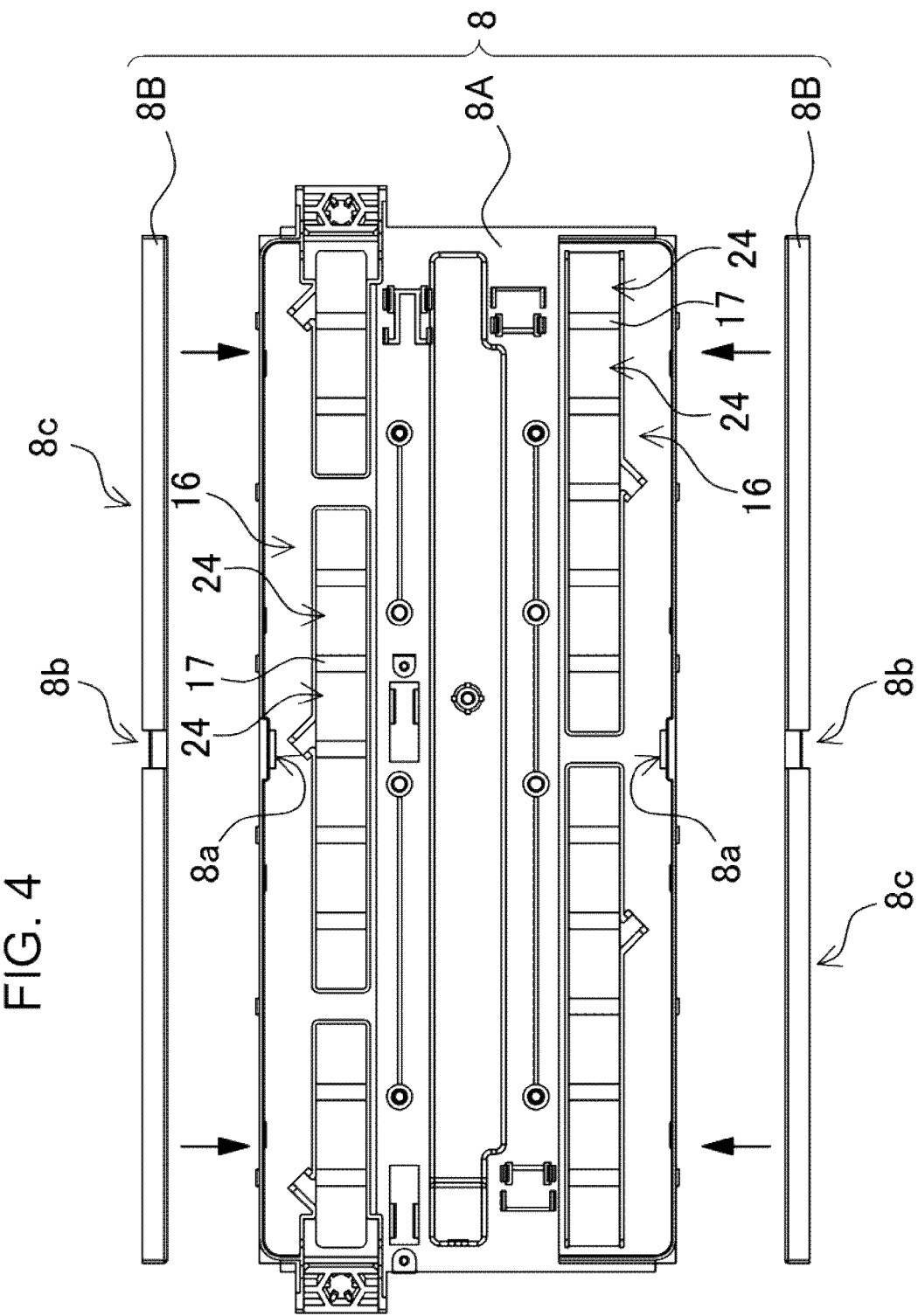
FIG. 4 is a plan view of a bus bar holder.

As shown in the explored perspective view of FIG. 2 and the plan view of FIG. 4, the intermediate holder 8A has the hook portions 31 at both side surfaces thereof. The hook portions 31 are provided at plural positions in spaces relationship with each other at each of the side surface. As shown in the sectional view of FIG. 7, each of the hook portions 31 is formed in such a way as inclining in the direction that the width of the hook portion 31 is wide at the top, narrow at the lower end, and a step portion is formed at the top end of the inclining surface, and then the engaging portion 32 of the side surface holder 8B is engaged with the step portion. By this structure, the return prevention structure which prevents the intermediate holder 8A once press-fitted from coming off the side surface holders 8B, is realized. Namely, once the intermediate holder 8A is pushed into and press-fitted between the side surface holders 8B, after that, the step portion is engaged with the engaging portion 32, and the upward movement of the intermediate holder 8A is prevented, and then the intermediate holder 8A can be stably fixed to the side surface holder 8B.

Here, the hook portion 31 is not limited to the structure in which the plural hook portions are provided in spaces relationship, and can be continuously provided along the longitudinal direction of the intermediate holder.

(Embodiment 2)

Further, the press-fitting structure is not limited to this construction, and other construction which can press-fit the intermediate holder and the side surface holders, can be suitably used. For example, in an embodiment 2 shown in FIG. 8, a hook portion 31' at the side surface holder 8B'side, and an engaging portion 32' at the intermediate holder 8A'side, can be provided.

(Binding Member 4)

As shown in FIG. 2 and FIG. 3, the binding member 4 extends in the stacking direction of the batter stacked member 2, and both ends of the binding member 4 are fixed to the end plates 3, and then the binding member 4 binds the battery stacked member 3 in the stacking direction. The binding member 4 shown in these figures is disposed at each of side surfaces 2B of both sides different from a first surface 2A as the upper surface of the battery stacked member 2.

The binding member 4 is a metal board having a predetermined width and a predetermined thickness along the surface of the battery stacked member 2. This binding member 4 is made of metal board of iron or the like. Preferably steel board can be used. The binding member 4 made of metal board has connecting portions 4b connecting to the end plates 3 at both ends of a side surface covering portion 4a thereof. Both end portions as the connecting portions 4b of the binding member 4 of the figure is bent at about right angle along the main surface of the end plates 3. The connecting portions 4b at both ends are coupled to the end plates 3, and the connecting portions 4b are engaged with a pair of the end plates 3 which are disposed at both ends of the battery stacked member 2. And the battery stacked member 2 is sandwiched and fixed from both ends by a pair of the end plates 3 having a predetermined space. The connecting portions 4b of the binding member 4 of FIG. 2 and FIG. 3 are connected to press-fitting recess portions 3A provided at four corner portions of the end plates 3, and four bars as the binding member 4 are coupled to a pair of the end plates 3. Therefore, the connecting portion 4b of the binding member 4 is bent along the press-fitting recess portion 3A of the end plate 3.

(First Binding Bar 4A, Second Binding Bar 4B)

As shown in FIG. 2 and FIG. 3, bars as the binding member 4 are in spaced relationship vertically with each other at each of the side surfaces of the battery stacked member 2. The binding member 4 comprises a first binding bar 4A, and a second binding bar 4B. The first binding bar 4A is disposed at an edge portion of the upper surface side of the battery stacked member 2. This first binding bar 4A is bent, and has a side surface portion which contacts the side surface of the battery stacked member 2, and an upper surface portion which is bent at right angle to the side surface portion and covers the upper surface of the battery stacked member 2 so as to have an L-shape sectional view in the lateral and vertical direction.

(Upper Surface Covering Portion 4c)

Further, the first binding bar 4A comprises a side covering portion 4a covering the side surface of the battery stacked member 2, and an upper covering portion 4c covering and pushing the upper surface of the stacked battery member 2 in the vertical sectional L-shape. As the battery stacked member 2 is pushed or pressed from the upper surface by the upper covering portion 4c, the upper surfaces of each of the battery cells 1 constituting the battery stacked member 2 are roughly located in the same plane.

Here, the upper covering portion 4c push or press the upper surfaces of the battery cells 1 through the side surface holder 8B, without directly pushing or pressing. Namely, the side surface holder 8B is fixed to the edge portion of the battery stacked member 2 in advance, and the first binding bar 4A pushes or presses the side surface holder 8B.

(Insulating Sheet 54)

Further, as mentioned above, as the first binding bar 4A is bent in the vertical sectional L-shape covering the edge in the side surface and the upper surface of the battery stacked member 2, it is necessary to insulate the adjacent battery cells 1 from each other in the side surface of the battery stacked member 2. Accordingly, an insulating sheet 54 is disposed between the side surface of the battery stacked member 2 and the first binding bar 4A. The insulating sheet 54 is a resin sheet having excellent insulation property, for example, PET or the like. In addition, in this instance, the insulating sheet 54 and the side surface holder 8B are made as separate parts, but it is possible to make those in one part.
(C-shaped Slit 8c)

Further, the upper covering portion 4c of the first binding bar 4A can be covered in a state of pressing the upper surfaces of the battery cells 1 without the upper surface of the first binding bar 4A exposed. From this, unintentional conducting can be prevented. In the instance of FIG. 5, FIG. 10, the side surface holder 8B covers also the upper surface of the first binding bar 4A. The side surface holder 8B has a C-shaped slit 8c in the sectional view, and opens toward side. The end edge of the upper covering portion 4c is inserted into the opening of the C-shaped slit 8c. By this, the upper surface of the first binding bar 4A is covered and insulated, and the first binding bar 4A is disposed in a surely positioned state by the C-shaped slit 8c, and binds while pushing or pressing the upper surface of the battery stacked member 2.
(Intermediate Fixing Structure)

Further, the first binding bar 4A has an intermediate fixing structure to couple the bus bar holder 8 at the intermediate portion thereof. Concretely, as shown in FIG. 10 to FIG. 12, the first binding bar 4A has an intermediate fixing projection 4e projecting toward the intermediate holder 8A side at the intermediate portion thereof. On the other, the intermediate holder 8A has an intermediate engaging portion engaged to the intermediate fixing projection 4e at a position corresponding to the intermediate fixing projection 4e. Such an intermediate fixing structure can prevent the binding member 4 from convexly curving outward from the side surface side at the intermediate portion of the binding member 4

Namely, as the number of the battery cells constituting the battery stacked member increases, the binding member is made longer, and it is apt to make space between the intermediate portion of the binding member and the battery stacked member. Especially, the binding member fundamentally makes strength binding the end plates, and is effective to bind the battery stacked member, and then strength pushing the upper surface or the side surface is weak. As a result, as the binding member is made longer in the stacking direction of the battery cell, it is apt to make space from the battery stacked member at the intermediate portion of the binding member. Therefore, as mentioned above, in the upper surface of the battery stacked member, the first binding bar 4A is prevented from convexly curving by inserting into the C-shaped slit 8c. Further, in the side surface of the battery stacked member, the intermediate fixing structure coupling to the bus bar holder 8 prevents the first binding bar 4A from convexly curving outward from the side surface.
(Intermediate Fixing Projection 4e)

The intermediate fixing projection 4e extends from the upper surface covering portion 4c as the upper surface portion of the first binding bar 4A to the intermediate holder 8A side. Especially, the intermediate fixing projection 4e has a bending board 4f which projects toward the intermediate holder 8A with its tip portion bent upward. Preferably the intermediate fixing projection 4e is integrally made with the binding member 4, and then it makes the structure simple.
(Recess Portion 8b)

Further, in the intermediate portion of the C-shaped slit 8c of the side holder 8B, the bottom surface portion of the C-shaped slit 8c has a through hole at the portion corresponding to the intermediate fixing projection 4e such that the intermediate fixing projection 4e extends beyond the side surface holder 8B to the intermediate holder 8A side. Especially, in the instance of FIG. 10, as the bent board 4f is the tip portion of the intermediate fixing projection 4e, a recess portion 8b is made by cutting out the upper surface portion as one surface of the C-shaped slit 8c. The recess portion 8b is formed in the about same width as that of the intermediate fixing projection 4e, and by this, the intermediate fixing projection 4e is held in a positioned state by the recess portion 8b.
(Intermediate Engaging Portion)

On the other hand, the intermediate engaging portion of the intermediate holder 8A is an engaging slit 8a into which the bending board 4f is inserted. As shown in the enlarged sectional perspective view of FIG. 10 and the plan view of FIG. 4, at the intermediate portion in the longitudinal direction of the intermediate holder 8A, the engaging slit 8a is opened and provided so as to insert and engaging the bent board 4f into at the position corresponding to the bent board 4f of the intermediate fixing projection 4e. Especially, the bent board 4f is bent at about right angle to the intermediate fixing projection 4e, in the other words the bent board 4f, the intermediate fixing projection 4e, and the side surface covering portion 4a are bent in a step shape, and the bent board 4f and the side surface covering portion 4a are disposed in approximate parallel. By this, the bent board 4f has engaging effect to the maximum degree, and the intermediate portion of the first binding bar is prevented from making space from the battery stacked member 2. Especially, when the power supply device is used for a vehicle, as it is exposed to vibration and shock, it prevents the binding member 4 from making space from the battery stacked member by such outside force, and reliability of insulation or the like can be improved.

Here, the intermediate fixing structure in the above instance is provided at only one portion in the center of the longitudinal direction. However, needless to say, it is possible to provide the intermediate fixing structures at plural portions in the longitudinal direction.
(Binding Hole 4d)

In addition, the first binding bar 4a has one or more binding hole 4d to open. By forming such a hole, the first binding bar 4A is apt to be deformed. Especially, when the battery cell 1 are swollen or expanded by charging and discharging or the like, and the length of the battery stacked member in the stacking direction is elongated, the deformation of the binding hole 4d reduces excessive load on connecting portions of the binding member 4 and the end plates 3. Here, as the binding hole is made bigger or the number of the binding holes is increased, mechanical strength of the binding member 4 is weakened. Therefore, the size and the number of the binding hole 4d are predetermined considering the balance of the strength and the deformation.
(Second Binding Bar 4B)

On the other hand, the second binding bar 4B is disposed at the edge portion of the lower surface side. This second binding bar 4B comprises a side surface portion which contacts the side surface of the battery stacked member 2 and a under surface portion which covers the under surface of the battery stacked member 2 so as to have an L-shape sectional view in the lateral and vertical direction.

Here, in the instance shown in FIG. 2 and FIG. 3, the first binding bar 4A and the second binding bar 4B have different shapes, but those can be also the same shape. In this case, by common parts utilization, manufacturing cost can be reduced. For example, in the instance of the figure, only the first binding bar 4A has the binding hole 4d, but the second binding bar 4B has no hole. However, the second binding bar 4B can also have the binding hole.

(Engaging Structure of Binding Member 4 and End Plate 3)
(Plate Engaging Portion 42)

Further, preferably as shown in the explored perspective view of FIG. 13A, the binding member 4 is engaged and fixed to the end plates 3 without screw or the like. In conventional structure, the binding member was fixed to the end surface of the end plate by screw or the like. In such a fixing structure, fixing by screw or the like takes time. Especially, when the number of the binding member is increased, the number of fixing portion is also increased, and then it increases assembling cost. Therefore, plate engaging portions 42 projects on the end plates 3, and binding engaging holes 4g which open in the binding member are engaged to the plate engaging portions 42. This structure can eliminate works of fixing by screw or the like, and then the binding member can be easily fixed to the end plate 3. In addition, according to this structure, as the binding member 4 can be fixed to a predetermined position, a positioning of the binding member is also carried out at the same time, and working efficiency of assembling is improved, and then assembling time can be shortened. Further, dispensing with separate part of screw or the like, cost reduction of parts can be made.

In the instance of FIG. 13A, the plate engaging portions 42 are provided at the four corners of the main surface of the end plate 3. From this, the first binding bar 4A and the second binding bar 4B as the binding member 4 are vertically disposed at each of the left and right side surfaces of the battery stacked member 2, and then total four binding bars can bind the battery stacked member 2. In the instance of FIG. 13A, in the plate engaging portions 42, first plate engaging portions 42a provided above are engaged to the first binding bar 4A, and second plate engaging portions 42b provided below are engaged to the second binding bar 4B.

Here, the plate engaging portions 42 has a +-shape. The +-shaped plate engaging portions 42 is inserted into the binding engaging hole 4g, and contacts the inner surface of the binding engaging hole 4g, and the first binding bar 4A is positioned. Further, as shown in FIG. 13D, in a state that the +-shaped plate engaging portions 42 is inserted into, and engaged to the binding engaging hole 4g, preferably a gap g in the vertical direction between the inner surface of the binding engaging hole 4g and the outer surface of the plate engaging portions 42 is provided. In this instance, in the horizontal direction,
the inner surface of the binding engaging hole 4g contacts the outer surface of the plate engaging portions 42. By this structure, the binding engaging hole 4g of the first binding bar 4A is engaged to the plate engaging portions 42, and then the binding engaging hole 4g is positioned in the horizontal direction. In other words, in a state that the first binding bar 4A is engaged to the end plate 3, the battery stacked member 2 bound by the first binding bar 4A is held so as to be slidable only in the vertical direction and positioned in the horizontal direction. Therefore, the battery cells 1 constituting the battery stacked member are positioned in the horizontal direction by the end plate 3 being engaged to the first binding bar 4A. On the other hand, in the vertical direction, by providing the gap g, slippage or manufacturing error in the vertical direction, or the like can be absorbed. In addition, as shown in the vertical sectional view of FIG. 13E, when the power supply device 100 is fixed to a base plate BP, a bolt 56 is inserted into an end plate through hole 3b which vertically penetrates the end plate 3 and fixed, and then the binding engaging hole 4g can be positioned in the vertical direction. The base plate BP is, for example, in the power supply device for a vehicle, a chassis of a vehicle to which the power supply device is fixed.

(Bolt Fixing Hole 4i)

Figure 13F:
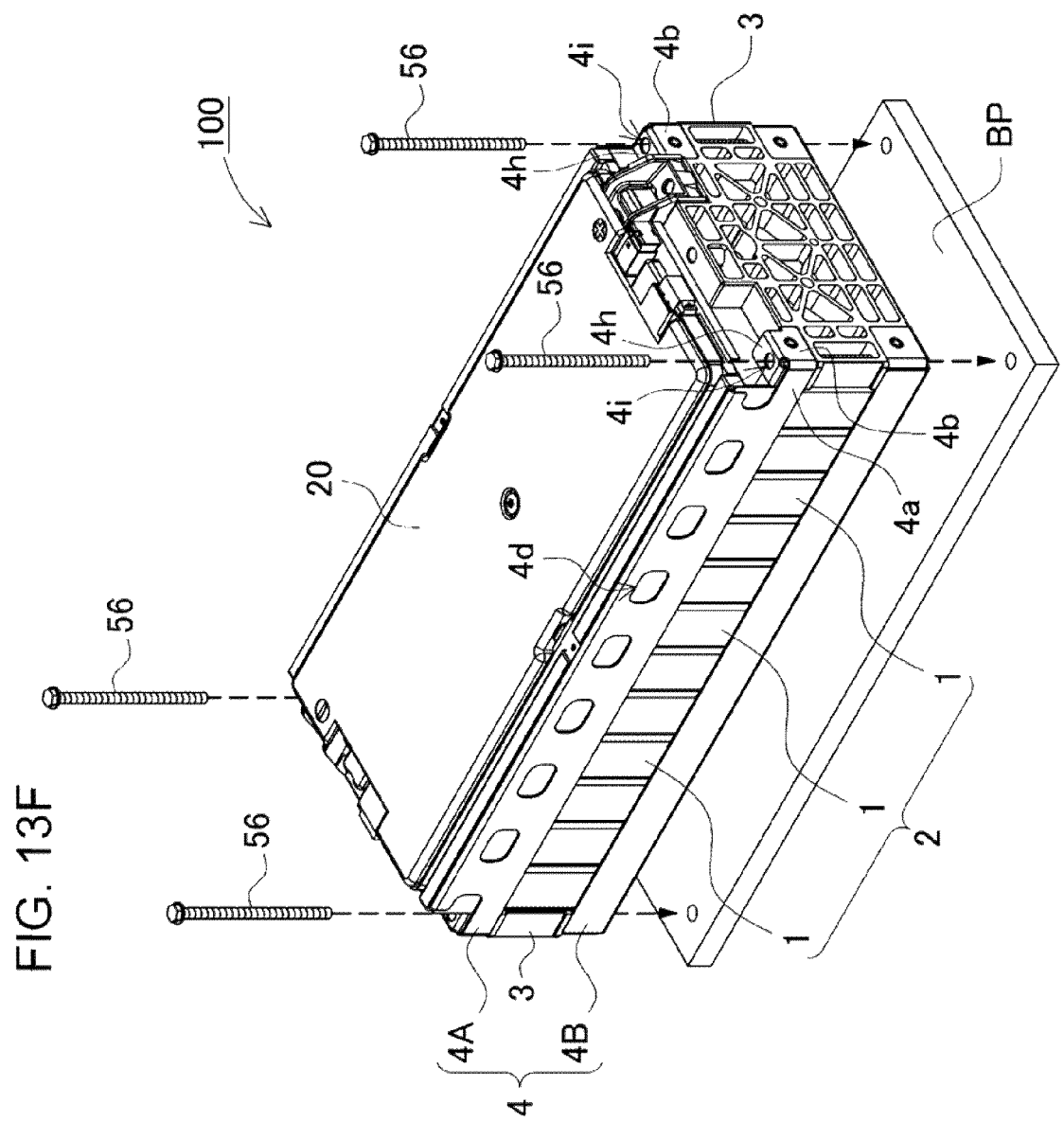
FIG. 13F is an explored perspective view showing a state that the end plate of FIG. 13D is fixed to the base plate.

As shown in the explored perspective view of FIG. 13F, when the power supply device 100 is set to the base plate BP, the first binding bars 4A are fixed to the end plate 3 by the bolts which vertically penetrate the end plate 3. In the upper first binding bar 4A, the connecting portion 4b is further bent in parallel with the upper surface covering portion 4c as a parallel bending board 4h, and a bolt fixing hole 4i is opened in the parallel bending board 4h. The bolt fixing hole 4i is positioned at the upper opening portion of the end plate through hole 3b in a state that the first binding bar 4A is set to the end plate 3. By this structure, the bolt 56 is inserted into the bolt fixing hole 4i and the end plate through hole 3b, the first binding bar 4A and the end plate 3 are fixed. Further, when the first binding bar 4A is fixed to end plate 3, the battery cells 1 which are slidable in the vertical direction, are restricted vertically, and then the first binding bar 4A positions the battery cells 1. By providing the gap g in this way, slippage or manufacturing error in the vertical direction, or the like can be absorbed. Especially, at the view point of the working efficiency, when the battery cells 1 in both the vertical direction and the horizontal direction are simultaneously positioned, working efficiency is low, and productivity is decreased. In contrast, in this embodiment, in a state that the first binding bar 4A is engaged to the end plate 3 by temporarily fixing, the battery cells 1 are positioned by restricting in the horizontal direction, and at the time of setting the power supply device to a vehicle, the battery cells 1 are positioned by restricting in the vertical direction, and then working efficiency can be improved. In addition, for example, in the power supply device for a vehicle, when the power supply device is set to the vehicle, a space between the upper and lower binding bar 4A, 4B is compressed, and then vibration-resistant strength of the battery cells 1 can be improved.

It is desirable that the gap g is provided at either of the upper and lower binding bars. For example, when the bottom surface of the battery stacked member 2 is the fixing surface of the power supply device, the gap is provided only at the upper first plate engaging portion 42a, and not provided at the lower second plate engaging portion 42b. By this, as reference position of the lower second plate engaging portion 42b, while the power supply device is fixed, slippage or manufacturing error can be absorbed by the upper first plate engaging portion 42a, and then the battery stacked member 2 can be stably fixed.

In addition, in the present invention, the structure in which the binding member is fixed to the end plates, is not limited to the above engaging structure, for example, the binding member 4 can be fixed to the end plates by screw, rivet. In this way, other structure is suitably used. In the instance shown in FIG. 13B as an embodiment 4, by using screws 33b, the binding member 4 is fixed to the end plate 3B. Further, in the instance shown in FIG. 13C as an embodiment 4, by using rivets 33c the binding member 4 is fixed to the end plate 3C.

(Battery Cell 1)

As shown in FIG. 1 to FIG. 3, in the battery cells 1 the width is longer than the thickness, in other words, the battery cell 1 has a rectangular box shape which is thinner than the width. The plural sheets of the battery cells 1 which are stacked in the thickness direction, constitute the battery stacked member 2. Each of the battery cells 11 is a lithium ion secondary battery. But, as the battery cell, a secondary battery, for example, a nickel hydride battery, a nickel cadmium battery, or the like can be used. The battery cell 1 of FIG. 3 has both wide rectangular surfaces, and the battery stacked member 2 is constituted by facing the wide rectangular surfaces of the battery cells 1. In each of the battery cells 1, positive and negative electrode terminals 13 project at both end potions of the upper surface of the sealing plate, and the gas exhaust opening of the gas exhaust valve is provided at the center thereof. In the rectangular battery cell 1, the tubular outer case having the bottom portion closing the bottom and the upper opening, is formed by pressing the metal board, and the upper opening is airtightly closed by the sealing plate. The sealing plate is a flat metal board, and its outer shape is the shape of the upper opening. The sealing plate is fixed to the peripheral edge of the outer case by laser welding, and airtightly closes the upper opening of the outer can. In the sealing plate fixed to the outer can, positive and negative electrode terminals 13 are fixed at both end portions of the upper surface of the sealing plate, and the gas exhaust valve inside the gas exhaust opening is provided.

(Spacer 15)

The spacer 15 is made of insulating material in order to insulate the outer cans of the battery cells from each other. Therefore, the spacer 15 is the about the same size as, or a little smaller than the main surface of the outer can of the battery cell 1. By this, interposing the spacers 15 between the battery cells 1, the main surfaces of the battery cells 1 are separated from each other, and insulated. Further, it is prevented that the spacer 15 is exposed from space between the battery cells 1, and it is also prevented that the size of the battery stacked member 2 is made big. The spacer 15 is a sheet made of resin having excellent insulation property (for example, PET or the like). In addition, by making the spacer 15 thin, thickening of the battery stacked member 2 can be prevented.

(Spacer Hole Portion 15b)

Preferably, the spacer 15 has a spacer hole portion 15b at the center portion thereof. The interval between the periphery of the spacer hole portion 15b and the outer side of the spacer 16 is approximately equal. In the instance shown in FIG. 10, the outer shape of the spacer 15 is a chamfered rectangular shape. The spacer hole portion 15b is also a chamfered rectangular shape. By providing the spacer hole portion 15b, even though the battery cells 1 are swollen or expanded, the spacer hole portion 15b can absorb such swell or expansion to some extent. Especially, in the battery cell 1, the inner electrode assembly is swollen or expanded by quick charging or discharging, and then the swell or expansion of the outer can happens. In this case, by using the structure of absorbing the swell or expansion, load to the binding member is reduced, and then reliability can be improved.

Preferably, the spacer hole portion 15b is a through hole. The processing of make a through hole in the spacer 15 is easy, and then manufacturing cost can be reduced.

(Bus Bar 14)

Each of the battery cells 1 has a pair of the positive and negative electrode terminals 13. In a state of stacking the battery cells 1, the electrode terminals 13 of the adjacent battery cells 1 are connected by the bus bar 14 having conductivity. By connecting way of the bus bar 14, the battery cells 1 are connected in series or parallel. In the instance of FIG. 2, by connecting the positive electrode terminal and the negative electrode terminal of the adjacent battery cells by the bus bars 14, twelve of the battery cells 1 are connected in series. Preferably, the bus bars 14 is made of metal board having excellent conductivity and suitable for laser welding. Here, the outer shape of the bus bar 14 is rectangular in the plan view, like a track shape of the end portion thereof chamfered in a semicircular shape.

(Voltage Detecting Line)

Further, in order to measure the cell voltage of each of the battery cells 1, a voltage detecting line is fixed to each of the bus bars 14 to detect the voltage. The voltage detecting line comprise conducting lead, harness, flexible printed board or circuit (FPC) or the like, and one end thereof is connected to the circuit board 9. In the instance of FIG. 2, the voltage detecting line of the FPC is fixed on the upper surface of the bus bars 14.

(Bus Bar Holder 8)

The bus par holder 8 is fixed on the upper surface of the battery stacked member 2. The bus bar holder 8 is made of insulating material, and in order to avoid unintentional conducting between the bus bars 14 and the battery cells 1, the bus bar holder 8 covers the upper surface of the battery cells 1. As mentioned above, this bus bar holder 8 is divided in three parts of the intermediate holder 8A and the side surface holders 8B of its side. As shown in the explored perspective view of FIG. 2, the intermediate holder 8A is fixed by the press-fitting structure 30 which is provided at the connecting surface to the side surface holder 8B.

(Intermediate Holder 8A)

In a state that the intermediate holder 8A is fixed on the upper surface of the battery stacked member 2, the opening windows 24 are opened in order to expose and connect the electrode terminals 13. Therefore, while the upper surfaces of the battery cells 1 are insulated except portions necessary to electrically connect, by the electrode terminals 13 exposed through the opening windows 24, electrical connections between the electrode terminals 13 are kept.

(Positioning Guide 16)

In addition, the intermediate holder 8A has positioning guides in which the bus bars 14 are disposed and positioned in order to connect the electrode terminals 13 by the bus bars 14. In the instance of FIG. 2 and FIG. 4, positioning guides 16 are formed in the wall shape at the portions where the bus bars 14 are fixed in order to position the bus bars 14. In this instance, the wall shaped portions project from the surface of the intermediate holder 8A along the outer shape of the bus bars 14, and then the positioning guides 16 are formed integrally with the intermediate holder 8A. The positioning guides 16 have insulating portions 17 having lattice shape to support the bottom surface of the bus bars 14 inserted therein. The opening windows 24 are formed in the positioning guides 16 in order to connect the bus bars 14 inserted into the positioning guides 16 to the electrode terminals 13 of the battery cells 1. On the other hand, in case that the whole positioning guide 16 is opened, the bottom surfaces of the bus bars 14 contact the sealing plate on the upper surface of the outer cans in the battery cells, and then there is a possibility that unintentional conducting happens. Therefore, only the electrode terminals 13 are conducting, and other portions, for example, the sealing plates or the like are not exposed more than necessary, and by being covered by the holder cover, the bus bar 14 and the battery cells 1 are insulated from each other, reliability can be improved.

(Insulating Portion 17)

The positioning guide 16 and the insulating portion 17 are suitably designed according to the shape pf the using bus bar 14, the location of the electrode terminals 13, or the like. The outer shape of the bus bar 14 is the track shape in the plan view, and is in left-right symmetry, and then the positioning guide 16 corresponding to this is formed as the recess into which the positioning guide 16 guides the bus bar 14 of the track shape, and the opening windows 24 are formed as the through holes at both ends of the positioning guide 16, and the insulating portion 17 are formed between the opening windows 24. Preferably, the positioning guides 16 and the insulating portion 17 are formed integrally with the intermediate holder 8A. As the intermediate holder 8A is made of resin, the positioning guide 16 can be easily made in such a shape.

(Gas Duct)

Further, the intermediate holder 8A has a gas duct 6 which is disposed at the position corresponding to the gas exhaust valve at the bottom surface side thereof. The gas duct 6 is made so as to guide a high pressure gas exhausted from the battery cell 1 at the time of the gas exhaust valve opening. Preferably, the gas duct 6 is formed integrally with the intermediate holder 8A.

Here, this structure is one instance, and for example, the gas duct can be made as the separate part from the intermediate holder. In addition, a gas exhaust tube which guides and exhaust the gas exhausted into the gas duct outside, can be connected.

(Circuit Board 9)

Further, the circuit board 9 including electrical circuits is fixed on the upper surface of the intermediate holder 8A. The electrical circuits included in the circuit board 9 are a protection circuit, a controlling circuit or the like to monitor voltage of the battery cell 1 or the like. Here, the controlling circuit does not necessarily need to be installed in all of the power supply device, for example, when the plural power supply devices are connected as the power supply system, only the one power supply device has the controlling circuit and the protection circuit, and the other power supply devices have only the protection circuits, and then the one power supply device can control each of the power supply devices in the centralized control way.

(Circuit Board Positioning Boss 50)

As shown in the explored perspective view of FIG. 14 and the sectional view of FIG. 15, the intermediate holder 8A has a circuit board positioning boss 50 to fix the circuit board 9 at the center portion thereof. The circuit board positioning boss 50 has holding projections to hold the circuit board 9 at the periphery thereof. By this, the circuit board 9 is positioned and fixed on the upper surface of the bus bars 14.

(Holder Cover 20)

As shown in FIG. 1 and FIG. 2, a holder cover 20 is fixed on the upper surface of the intermediate holder 8A. The holder cover 20 covers the upper surface of the intermediate holder 8A, and protects the bus bars 14 connected to the battery stacked member 2 or the circuit board 9. Therefore, the holder cover 20 has a shape which covers the intermediate holder 8A, and has space to store the circuit board 9 inside there, made of plastic and molded. The holder cover 20 has a whole shape of a shallow receptacle opening downward, and the center portion of the holder cover 20 is deeper than the periphery of the holder cover, and a storing recess portion which stores the circuit board 9 is provided there.

In the circuit board positioning boss 50 provided in the intermediate holder 8A, a screw hole is opened to fix the holder cover 20 and the intermediate holder 8A by screw. By this, by the circuit board positioning boss 50, the circuit board 9 and the holder cover 20 are fixed at the same time, and the circuit board 9 can be positioned and fixed on the upper surface of the bus bar 14.

(Method for Manufacturing Power Supply Device)

As mentioned above, the bus bar holder 8 is divided into the three portions, and in the state that the battery stacked member 2 is bound by the binding member 4 in advance, the intermediate holder 8A positioning the bus bars 14 or the like can be fixed. Therefore, working efficiency of assembling the power supply device can be improved. Namely, when rectangular battery cells are stacked, the end plates are pressed in the compressed state by the jig, and then the binding member binds. Therefore, the bus bars could not be assembled in advance of fixing the bus bar holder. In contrast, in this disclosure, the insulating portion (the side surface holder 8B) of the binding member 4 are divided in the bus bar holder, and the binding member 4 binds, and then the pressure by the jig is early released, and after that, the intermediate holder 8A related to fixing the bus bars 14 is fixed, and then working efficiency is improved. In addition, as the bus bar holder 8 is divided, the intermediate holder 8A is not fixed by the binding member. However, the connecting surface between the intermediate holder 8A and the side surface holder 8B has the press-fitting structure, and the intermediate holder 8A can be fixed.

Figure 16:
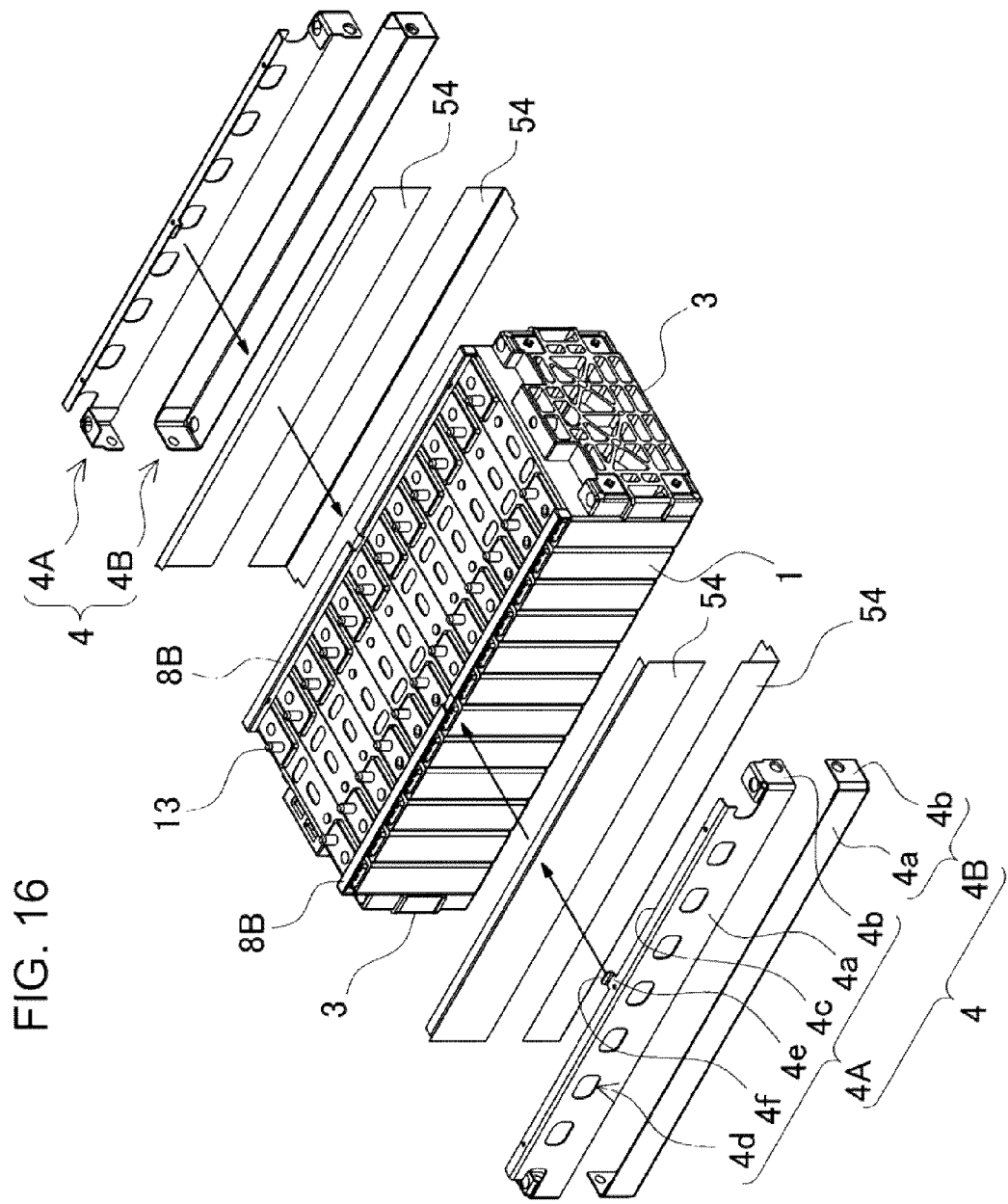
FIG. 16 is an explored perspective view showing a state that the binding member binds a battery stacked member.
Figure 17:
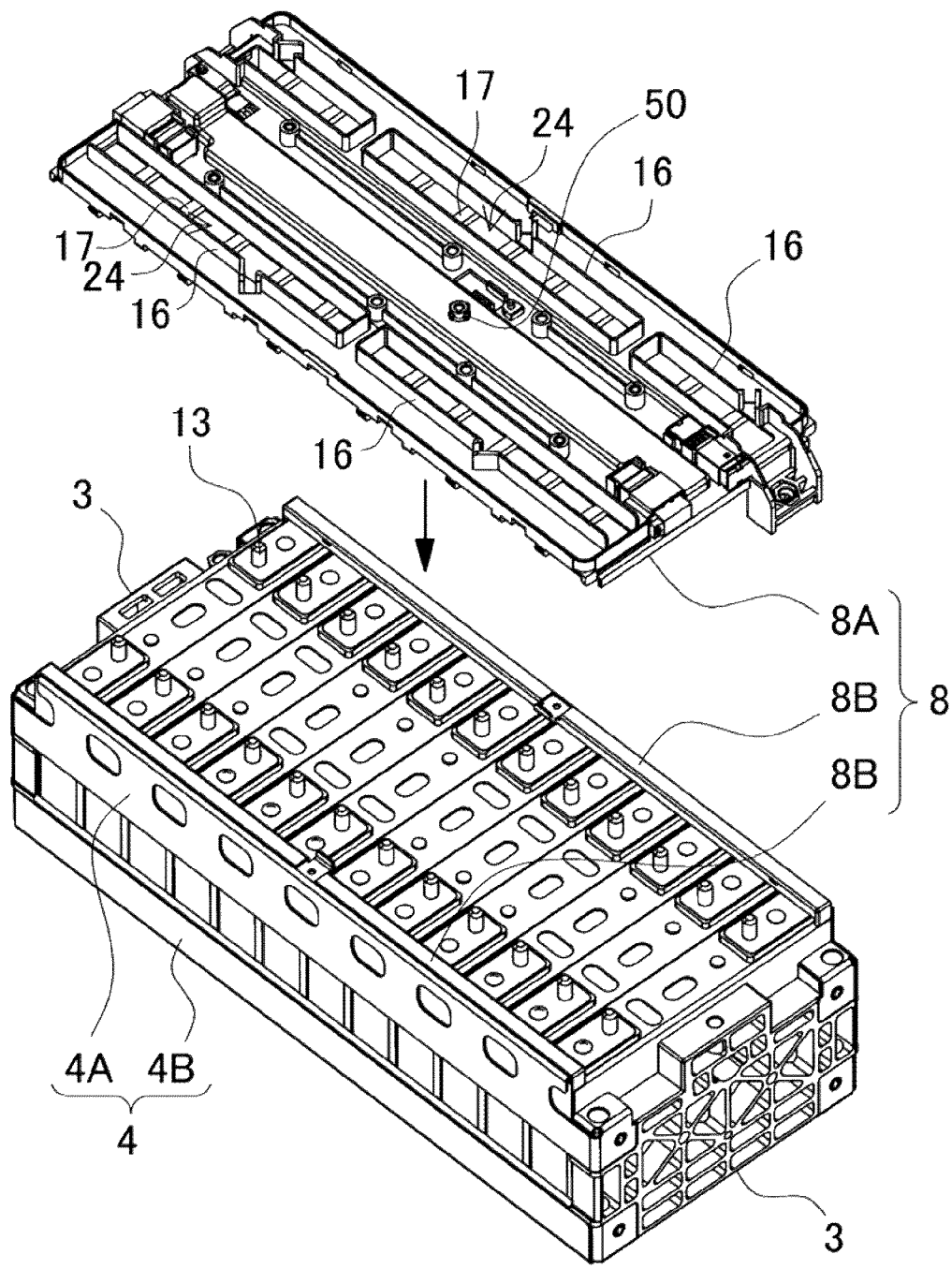
FIG. 17 is an explored perspective view showing a state that an intermediate holder is press-fitted between side surface holders of FIG. 16.
Figure 18:
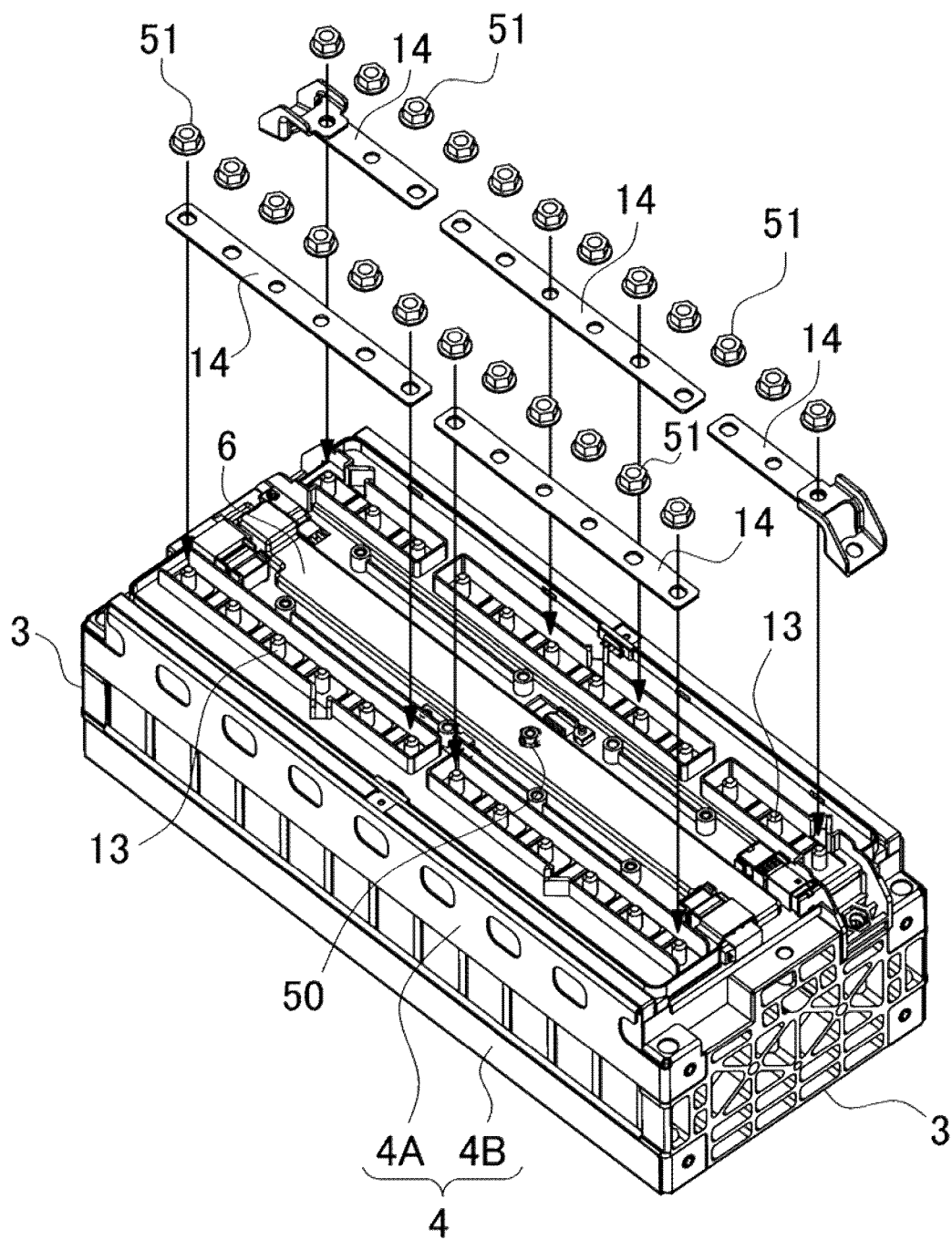
FIG. 18 is an explored perspective view showing a state that after the bus bar holder is fixed to the battery stacked member, the bus bars are fixed.

Here, the method for manufacturing the power supply device is explained based on FIG. 16 to FIG. 18. In these figures, FIG. 16 is the explored perspective view showing the state that the binding member 4 binds the battery stacked member 2, FIG. 17 is the explored perspective view showing the state that the intermediate holder 8A is press-fitted between the side surface holders 8B of FIG. 16, FIG. 18 is the explored perspective view showing the state that after the bus bar holder 8 is fixed to the battery stacked member 2, the bus bars 14 are fixed. As shown in FIG. 16, the battery stacked member 2 is bound by the binding member 4. In a state that the battery cells 1 are stacked interposing the spacers 15 therebetween, the end plates at the end portions of the battery stacked member 2 are pressed or compressed by the jig. In this state, in the side surfaces of the battery stacked member 2, the insulating sheets 54 cover each of the upper and lower edge portions. At the upper edge portions, the side surface holders 8B are disposed. The first binding bars 4A and the second binding bars 4B are respectively bound at the upper and lower portions of the side surfaces of the battery stacked member 2. The first binding bars 4A are positioned with the end edges thereof inserted into the C-shaped slits 8c. The first binding bars 4A and the second binding bars 4B are respectively fixed to the end plates 3. After that, the jig is detached.

Next, as shown in FIG. 17, in a state that the side surface holders 8B are fixed to the battery stacked member 2, the intermediate holder 8A is press-fitted by using the press-fitting structure. In this disclosure, the engaging board 32 provided in the side surface holder 8B is engaged to the hook portion 31 provided in the intermediate holder 8A, and the intermediate holder 8A is press-fitted between the side surface holders 8B.

Further, as shown in FIG. 18, the bus bars 14 are respectively fixed to the intermediate holder 8A. The bus bars 14 are fixed to the electrode terminals 13 of the battery cells 1 by screws 51 shown in FIG. 3 or the like, or laser welding. In addition, in electrode holes which are opened in the bus bar 14, one hole is made in a circle shape, and the other is made in an enlonged circle shape or a track shape, and the hole of the enlonged circle shape or the track shape is screwed or laser-welded through a welding ring. In this case, at first, the electrode hole 15 of the circle shape is fixed to the electrode terminal 13, and after that, the hole of the enlonged circle shape or the track shape is fixed to the electrode terminal 13. The dispersion of distances between the electrode terminals 13 of the stacked battery cells 1 is absorbed by the hole of the enlonged circle shape or the track shape adjusting the welding location in the thickness direction of the battery cells 1. The electrode terminal 13 can be fixed with high reliability independent of manufacturing error.

The aforementioned power supply devices can be used as a power supply for vehicles. The power supply device can be installed on electric vehicles such as hybrid cars that are driven by both an internal-combustion engine and an electric motor, and electric vehicles that are driven only by an electric motor. The power supply device can be used as a power supply device for these types of vehicles.

(Hybrid Car Power Supply Device)

Figure 19:
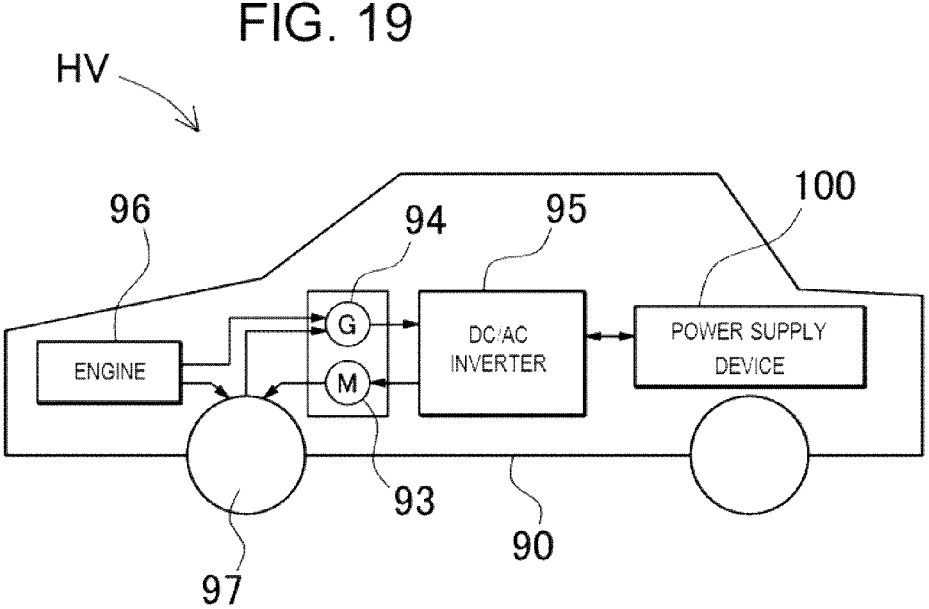
FIG. 19 is a block diagram showing one explanatory embodiment of a hybrid car driven by an engine and a motor in which the power supply device is installed.

FIG. 19 is a block diagram showing an exemplary hybrid car that is driven both by an engine and an electric motor, and includes the power supply device. The illustrated vehicle HV with the power supply device includes an electric motor 93 and an internal-combustion engine 96 that drive the vehicle HV, a power supply device 100 that supplies electric power to the electric motor 93, and an electric generator 94 that charges batteries of the power supply device 100, a vehicle body 90 that incorporates the engine 96, the motor 93, and the generator 94, and a wheel or wheels 97 that can be driven by the engine 96 or the electric motor 93, and drive the vehicle body 90. The power supply device 100 is connected to the electric motor 93 and the electric generator 94 via a DC/AC inverter 95. The vehicle HV is driven both by the electric motor 93 and the internal-combustion engine 96 with the batteries of the power supply device 100 being charged/discharged. The electric motor 93 is energized with electric power and drives the vehicle in a poor engine efficiency range, e.g., in acceleration or in a low speed range. The electric motor 93 is energized by electric power that is supplied from the power supply device 100. The electric generator 94 is driven by the engine 96 or by regenerative braking when users brake the vehicle so that the batteries of the power supply device 100 are charged.

(Electric Vehicle Power Supply Device)

Figure 20:
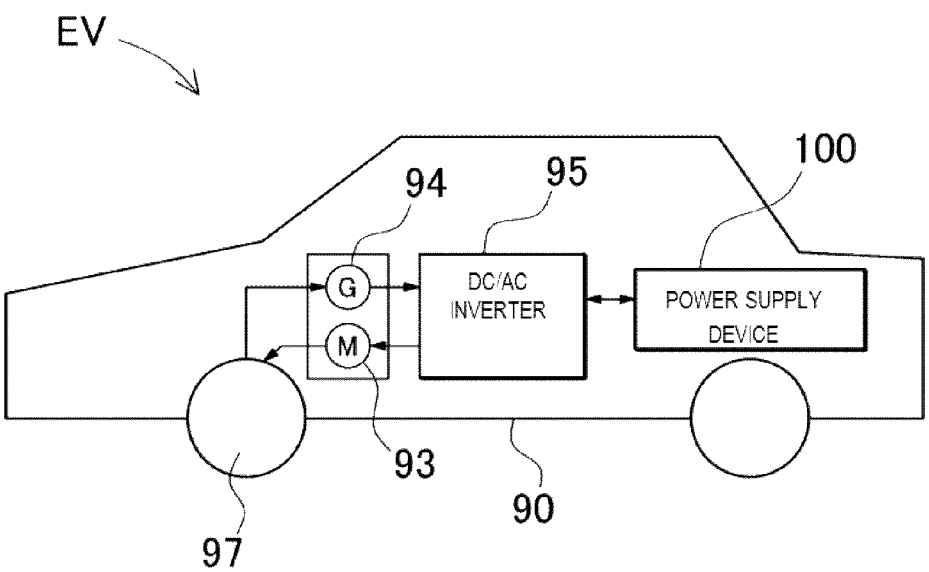
FIG. 20 is a block diagram showing one explanatory embodiment of an electric car driven only by a motor in which the power supply device is installed.

FIG. 20 shows an exemplary electric vehicle that is driven only by an electric motor, and includes the power supply device. The illustrated vehicle EV with the power supply device includes the electric motor 93, which drives the vehicle EV, the power supply device 100, which supplies electric power to the electric motor 93, and the electric generator 94, which charges batteries of the power supply device 100, a vehicle body 90 that incorporates the motor 93 and the generator 94, and a wheel or wheels 97 that can be driven by the electric motor 93, and drive the vehicle body 90. The electric motor 93 is energized by electric power that is supplied from the power supply device 100. The electric generator 94 can be driven by vehicle EV regenerative braking so that the batteries of the power supply device 100 are charged.

(Power Storage Type Power Supply Device)

Figure 21:
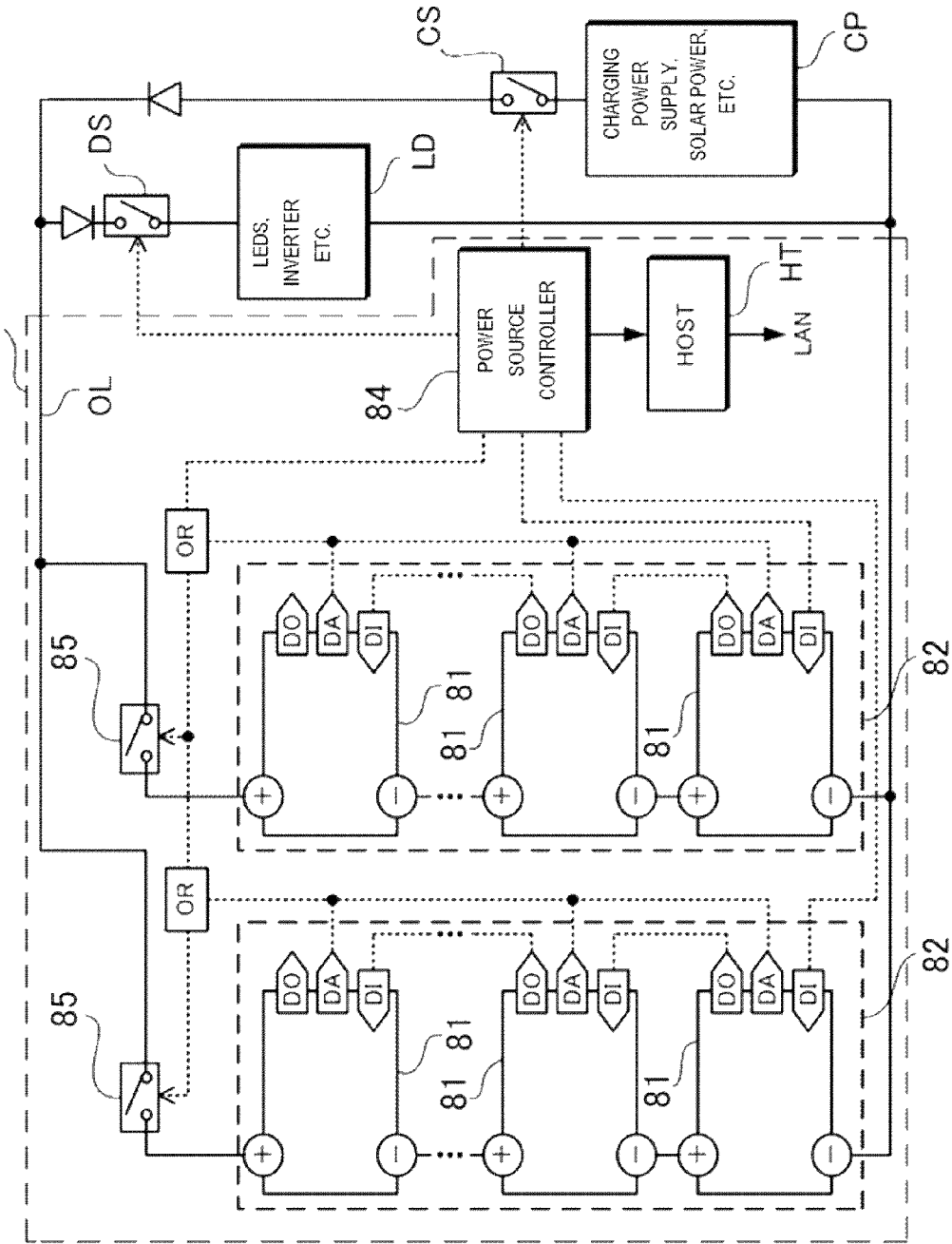
FIG. 21 is a block diagram showing one explanatory embodiment of a storage battery device using the power supply device.
Figure 22:
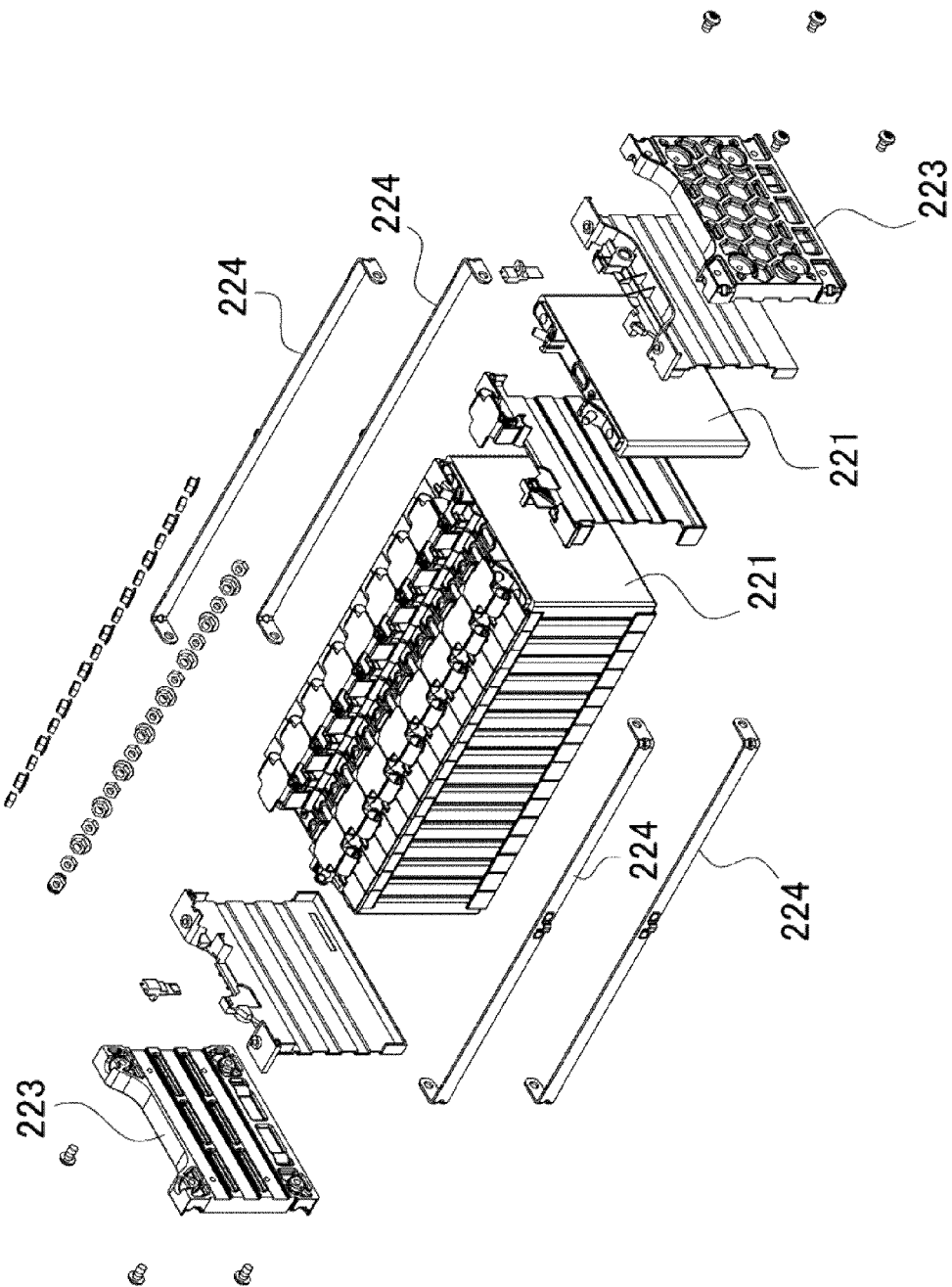
FIG. 22 is an explored perspective view showing a conventional power supply device.

The power supply device can be used not only as power supply of mobile unit but also as stationary power storage. For example, examples of stationary power storage devices can be provided by an electric power system for home use or plant use that is charged with sunlight or with midnight electric power and is discharged when necessary, a power supply for street lights that is charged with sunlight during the daytime and is discharged during the nighttime, or a backup power supply for signal lights that drives signal lights in the event of a power failure. FIG. 21 shows an exemplary circuit diagram. This illustrated power supply device 100 includes battery units 82 each of which includes a plurality of battery packs 81 that are connected to each other. In each of battery packs 81, a plurality of rectangular battery cells 1 are connected to each other in serial and/or in parallel. The battery packs 81 are controlled by a power supply controller 84. In this power supply device 100, after the battery units 82 are charged by a charging power supply CP, the power supply device 100 drives a load LD. The power supply device 100 has a charging mode and a discharging mode. The Load LD and the charging power supply CP are connected to the power supply device 100 through a discharging switch DS and a charging switch CS, respectively. The discharging switch DS and the charging operation switch CS are turned ON/OFF by the power supply controller 84 of the power supply device 100. In the charging mode, the power supply controller 84 turns the charging operation switch CS ON, and turns the discharging switch DS OFF so that the power supply device 100 can be charged by the charging power supply CP. When the charging operation is completed so that the battery units are fully charged or when the battery units are charged to a capacity not lower than a predetermined value, if the load LD requests electric power, the power supply controller 84 turns the charging operation switch CS OFF, and turns the discharging switch DS ON. Thus, operation is switched from the charging mode to the discharging mode so that the power supply device 100 can be discharged to supply power to the load LD. In addition, if necessary, the charging operation switch CS may be turned ON, while the discharging switch DS may be turned ON so that the load LD can be supplied with electric power while the power supply device 100 can be charged.

The load LD driven by the power supply device 100 is connected to the power supply device 100 through the discharging switch DS. In the discharging mode of the power supply device 100, the power supply controller 84 turns the discharging switch DS ON so that the power supply device 100 is connected to the load LO. Thus, the load LD is driven with electric power from the power supply device 100. Switching elements such as FET can be used as the discharging switch DS. The discharging switch DS is turned ON/OFF by the power supply controller 84 of the power supply device 100. The power supply controller 84 includes a communication interface for communicating with an external device. In the exemplary power supply device shown in FIG. 21, the power supply controller is connected to a host device HT based on existing communications protocols such as UART and RS-232C. Also, the power supply device may include a user interface that allows users to operate the electric power system if necessary.

Each of the battery packs 81 includes signal terminals and power supply terminals. The signal terminals include a pack input/output terminal DI, a pack abnormality output terminal DA, and a pack connection terminal DO. The pack input/output terminal DI serves as a terminal for providing/receiving signals to/from other battery packs and the power supply controller 84. The pack connection terminal DO serves as a terminal for providing/receiving signals to/from other battery packs as slave packs. The pack abnormality output terminal DA serves as a terminal for providing an abnormality signal of the battery pack to the outside. Also, the power supply terminal is a terminal for connecting one of the battery packs 81 to another battery pack in series or in parallel. In addition, the battery units 82 are connected to an output line OL through parallel connection switches 85, and are connected in parallel to each other.

INDUSTRIAL APPLICABILITY

A power supply device, a vehicle and a storage battery device equipped with the power supply device, and a method for manufacturing the power supply device according to the present invention can be suitably used as power supply devices of plug-in hybrid vehicles and hybrid electric vehicles that can switch between the EV drive mode and the HEV drive mode, electric vehicles, and the like. A vehicle including this power supply device according to the present invention can be suitably used as plug-in hybrid vehicles, hybrid electric vehicles, electric vehicles, and the like. Also, a power supply device according to the present invention can be suitably used as backup power supply devices that can be installed on a rack of a computer server, backup power supply devices for wireless communication base stations, electric power storages for home use or plant use, electric power storage devices such as electric power storages for street lights connected to solar cells, backup power supplies for signal lights, and the like.

The invention claimed is:

1. A power supply device comprising:
    plural battery cells having a rectangular box shape and electrode terminals;
    binding members binding a battery stacked member stacking the battery cells;
    bus bars connecting electrode terminals of the battery cells; and
    a bus bar holder covering the upper surface of the battery stacked member,
    wherein the binding members bind the battery stacked member at the right and left side surfaces of the battery cells of the battery stacked member and the upper surface thereof, and each of the binding members comprises side covering portions covering side surfaces of the battery stacked member, and upper covering portions covering the upper surface of the battery stacked member and integrally formed with the side covering portions,
    wherein the bus bar holder is divided into an intermediate holder located at an intermediate portion on the upper surface of the battery stacked member, and side surface holders each located at an end of the intermediate holder, and the side surface holders and the intermediate holder are press-fitted by a press-fitting structure, and
    wherein the intermediate holder is disposed between the upper covering portions extending in a first direction with respect to the battery stacked member, and
    each of the side surface holders are disposed on each of the upper covering portions located at both sides of the intermediate holder and extend in a second direction with respect to the battery stacked member that is perpendicular to the first direction.

2. The power supply device according to claim 1,
    wherein the press-fitting structure comprises, at connecting surfaces between the intermediate holder and the side surface holders, a hook portion projecting from one connecting surface, and an engaging portion engaged with the hook portion at another connecting surface.

3. The power supply device according to claim 1,
    wherein the binding member comprises a first binding bar and a second binding bar disposed in a vertically spaced relationship with respect to each other at a side surface of the battery stacked member.

4. The power supply device according to claim 1, further comprising an insulating sheet interposed between the binding member and the battery stacked member.

5. The power supply device according to claim 1,
    wherein the side surface holder has a C-shaped slit, and opens such that an end edge of the upper covering portions is inserted into the opening of the C-shaped slit.

6. The power supply device according to claim 1,
    wherein the binding member has an intermediate fixing projection projecting toward an intermediate holder side at the intermediate portion thereof, and the intermediate holder has an intermediate engaging portion engaged to the intermediate fixing projection at a position corresponding to the intermediate fixing projection.

7. The power supply device according to claim 6,
    wherein the intermediate fixing projection comprises a part of the binding members which each extends beyond the side surface holders, and the intermediate fixing projection is a bending board which is bent so as to project toward the intermediate holder,
    wherein the intermediate engaging portion is a slit into which the bending board is inserted.

8. The power supply device according to claim 7,
    wherein each side surface holder has a recess portion which holds the bending board.

9. The power supply device according to claim 1,
    wherein the binding member has one or more binding holes.

10. The power supply device according to claim 1,
    wherein the bus bar holder has positioning guides in which the bus bars are disposed, and in each of the positioning guides, an insulating portion having a lattice shape is provided.

11. The power supply device according to claim 1,
    wherein the battery stacked member has insulating spacers interposed between the battery cells, each of the insulating spacers has a spacer hole portion at the center portion thereof.

12. The power supply device according to claim 11,
    wherein the spacer hole portion of the spacer is a through hole.

13. The power supply device according to claim 1,
    further comprising a circuit board including an electric circuit to monitor the battery cells, which is fixed on the upper surface of the bus bar holder,
    wherein the bus bar holder has a circuit board positioning boss to fix the circuit board at the center portion thereof, and the circuit board positioning boss has holding projections to hold the circuit board at the periphery thereof.

14. The power supply device according to claim 13,
    further comprising a holder cover which covers the upper surface of the circuit board,
    wherein the circuit board positioning boss has a screw hole to fix the holder cover and the bus bar holder by screw.

15. A electric vehicle equipped with the power supply device according to claim 1, comprising:
    an electric motor being energized by electric power that is supplied from the power supply device;

a vehicle body having the power supply device and the electric motor; and a wheel being driven by the electric motor, and driving the vehicle body.

* * * * *